(12) United States Patent
Thai et al.

(10) Patent No.: US 11,394,793 B2
(45) Date of Patent: Jul. 19, 2022

(54) CLIENTS AGGREGATION

(71) Applicant: XCELASTREAM, INC., Gainesville, VA (US)

(72) Inventors: Ari Thai, Fairfax, VA (US); An Van Nguyen, Fairfax, VA (US)

(73) Assignee: XcelaStream, Inc., Gainesville, VA (US)

( * ) Notice: Subject to any disclaimer, the term of this patent is extended or adjusted under 35 U.S.C. 154(b) by 0 days.

(21) Appl. No.: 17/490,850

(22) Filed: Sep. 30, 2021

(65) Prior Publication Data

US 2022/0021745 A1    Jan. 20, 2022

Related U.S. Application Data

(63) Continuation of application No. 16/903,931, filed on Jun. 17, 2020, now Pat. No. 11,184,456.

(60) Provisional application No. 62/862,875, filed on Jun. 18, 2019.

(51) Int. Cl.
  *H04L 67/5651* (2022.01)
  *H04N 19/503* (2014.01)
  *H04L 65/60* (2022.01)

(52) U.S. Cl.
  CPC .......... *H04L 67/2828* (2013.01); *H04L 65/60* (2013.01); *H04N 19/503* (2014.11)

(58) Field of Classification Search
  CPC .... H04L 67/2828; H04L 65/60; H04N 19/503
  See application file for complete search history.

(56) References Cited

U.S. PATENT DOCUMENTS

| | | | |
|---|---|---|---|
| 5,768,445 A | 6/1998 | Troeller | |
| 7,551,620 B1 | 6/2009 | Samuels | |
| 8,102,916 B1 | 1/2012 | Masterson | |
| 10,946,283 B1 | 3/2021 | Meilich | |
| 10,984,400 B1 | 4/2021 | Koch | |
| 11,062,284 B1 | 7/2021 | Cunningham | |
| 2002/0188743 A1 | 12/2002 | Schaffrath | |
| 2004/0001508 A1 | 1/2004 | Zheng | |
| 2006/0013235 A1 | 1/2006 | Farnham | |
| 2006/0075132 A1 | 4/2006 | Liu | |
| 2007/0206621 A1 | 9/2007 | Plamondon | |
| 2007/0266170 A1 | 11/2007 | Mockett | |
| 2008/0256274 A1 | 10/2008 | Wohl | |
| 2010/0246602 A1 | 9/2010 | Barreto | |
| 2013/0066868 A1 | 3/2013 | Hecker | |
| 2013/0073609 A1* | 3/2013 | Connolly | G06F 16/9574 709/203 |
| 2015/0317176 A1 | 11/2015 | Hussain | |
| 2016/0094851 A1 | 3/2016 | Pu | |
| 2016/0246810 A1 | 8/2016 | Ackerman | |
| 2018/0284986 A1* | 10/2018 | Bhagi | G06F 11/2056 |

(Continued)

OTHER PUBLICATIONS

PCT Search Report and Written Opinion, PCT Application No. PCT/US2020/038180, dated Oct. 15, 2020.

*Primary Examiner* — Tracy Y. Li
(74) *Attorney, Agent, or Firm* — Esplin & Associates, PC

(57) ABSTRACT

A proxy device may organize a set of local devices as members of a union. The proxy device may create a set of virtual peripheral devices. The set of virtual peripheral devices may represent a set of physical peripheral devices connected to the set of local devices. The proxy device may communicate the set of virtual peripheral devices to a remote device.

14 Claims, 6 Drawing Sheets

(56) References Cited

U.S. PATENT DOCUMENTS

2019/0340833 A1\* 11/2019 Furtwangler ......... G06F 16/245
2020/0042989 A1 2/2020 Ramadoss
2020/0314200 A1\* 10/2020 Grandjean .......... H04L 63/1441
2021/0073881 A1 3/2021 Stoddard \* cited by examiner

CLIENTS AGGREGATION

FIELD

This disclosure relates to shared resource for transformation of data that reduces data compression/decompression performed by local devices.

BACKGROUND

In a computer network application, data may be compressed by a remote device before the data is sent to a local device over a network (e.g., the Internet). High compression of data may be needed to reduce the bandwidth utilization over the network and/or to provide the data to the local device within a short amount of time. However, compression of data may require the local device to perform decompression of data to use the information conveyed by the data. Higher amount of compression of the data may proportionally require more computation by the local device to decompress the data. The decompression of the data by the local device may add undesirable latency to the data usage.

To reduce the added latency, the local device may need to be equipped with adequate computing resources (e.g., processing speed, processing capability, memory, power). This may limit the types of local devices that may be used for a given network application. For example, a remote device acting as a server may provide information needed for an interactive video application, such as game streaming and/or remote desktop, to a local device acting as a client. The threshold of maximum latency allowed for such application may be lower than other applications (e.g., streaming non-interactive movies) and may thus require powerful, and hence expensive, computing devices that can quickly decompress the data stream to serve as clients.

Similarly, data may be compressed by a local device before the data is sent to a remote device over the network (e.g., the Internet). High compression of data may be needed to reduce the bandwidth utilization over the network and/or to provide the data to the remote device within a short amount of time. However, compression of data may require significant computation performed by the local device. The compression of the data by the local device may add undesirable latency to the data usage.

To reduce the added latency, the local device may need to be equipped with adequate computing resources (e.g., processing speed, processing capability, memory, power). This may limit the types of local devices that may be used for a given network application. For example, in a video conference application, the local device acting as a server may need to compress webcam data before sending it to a remote device acting as a client. The threshold of maximum latency allowed for such application may be lower than other applications (e.g., streaming non-interactive movies) and may thus require powerful, and hence expensive, computing devices that can quickly compress the data stream to serve as servers.

SUMMARY

This disclosure relates to systems and methods for sharing a resource for transforming data that reduces data compression/decompression to be performed by devices in a network application. A proxy device may be connected to a set of local devices and a set of remote devices. The set of local devices may include a first local device, a second local device, and/or other local devices. The set of remote devices may include a first remote device, a second remote device, and/or other remote devices. The proxy device, the remote devices, and/or the local devices may be in separate physical enclosures.

In some implementations, the first remote device and the second remote device may be different devices. In some implementations, the first remote device and the second remote device may be the same device.

In some implementations, the proxy device may be configured to reduce compression of data transmitted by the first remote device for one or more local devices. The proxy device may reduce the compression of the data by receiving compressed data from the first remote device. The received/compressed data may convey information. The proxy device may generate transformed data based on reduction of compression of the received/compressed data. The proxy device may transmit the transformed data to at least one local device of the set of local devices. Transmission of the transformed data to the local device(s) may enable the local device(s) to use the information without performing decompression of the received/compressed data. In other words, the proxy device may perform some or all of the data decompression that would otherwise be performed by the local device(s). Multiple local devices may time-share the proxy device for the reduction of compression of data. The reduction of compression of data for one local device may be independent of the reduction of compression of data for another local device.

In some implementations, the proxy device may be configured to increase compression of data transmitted by the first local device for one or more remote devices (e.g., the second remote device). The proxy device may increase the compression of the data by receiving uncompressed or compressed data from the first local device. The received data may convey information. The proxy device may generate transformed data based on increase in compression of the received data. The proxy device may transmit the transformed data to at least one remote device of the set of remote devices, such as the second remote device. Transmission of the transformed data to the remote device(s) may require less bandwidth and/or shorter amount of time compared to transmission of the original data received from the first local device. In other words, the proxy device may perform some or all of the data compression that would otherwise be performed by the first local device. Multiple local devices may time-share the proxy device for the increase in compression of data. The increase in compression of data for one local device may be independent of the increase in compression of data for another local device.

In some implementations, one or more data paths between the proxy device and one or more local devices (e.g., the first local device) may have higher bandwidth and/or lower latency than one or more data paths between the proxy device and one or more remote devices (e.g., the first remote device, the second remote device). As a result, the high bandwidth and/or low latency of the connection between the proxy device and the local device(s) may be utilized/leverage to reduce the amount of computation for compression or decompression required of the local device(s).

A proxy device may include one or more processors and/or other components. The processor(s) may be configured to facilitate the proxy device to reduce and/or increase compression of received data for a set of local devices. The processor(s) may be configured by machine-readable instructions and/or include specialized hardware components to provide one or more functionalities for reducing and/or increasing compression of received data. For example, the processor(s) may include one or more distinct hardware components configured to perform the reduction of and/or the increase in the compression of the received data. The processor(s) may include one or more processor components (e.g., software components and/or hardware components). The processor(s) may include one or more FPGA and/or ASIC devices. The distinct hardware component(s) may include one or more IP cores inside an FPGA and/or ASIC device. The processor components may include one or more of a remote communication component, a data transformation component, a local communication component, and/or other processor components.

The remote communication component may be configured to communicate with one or more remote devices. Communication with a remote device may include reception of data from the remote device and/or transmission of data to the remote device. For example, the remote communication component may receive compressed data from a remote device. The received data may convey information.

The data transformation component may be configured to transform data received from one or more remote devices and/or one or more local devices. Transformation of data may include reduction of compression of data, increase in compression of data, encoding conversion of information conveyed by the received data, and/or other transformation of data. For example, the data transformation component may generate transformed data based on reduction of and/or increase in compression of the received data and/or other information. Multiple local devices may time-share the proxy device for the reduction of and/or the increase in compression of received data. The reduction of and/or the increase in compression of received data for one local device may be independent of the reduction of and/or the increase in compression of received data for another local device.

The local communication component may be configured to communicate with one or more local devices. Communication with a local device may include reception of data from the local device and/or transmission of data to the local device. For example, the local communication component may be configured to transmit the transformed data to one or more local devices. The transformed data of compressed data may enable the local device(s) to use the information conveyed by the compressed data without performing decompression of the compressed data.

In some implementations, the reduction of the compression of the compressed data to generate the transformed data may include a full decompression. The full decompression may enable the local device(s) to use the information conveyed by the compressed data without performing decompression of the transformed data.

In some implementations, the reduction of the compression of the compressed data to generate the transformed data may include a partial decompression. The partial decompression may enable the local device(s) to use the information conveyed by the compressed data by performing decompression of the transformed data. The decompression of the transformed data may require consumption of less resources than the decompression of the compressed data.

In some implementations, the reduction of the compression of the compressed data to generate the transformed data may include encoding conversion of the information conveyed by the compressed data.

In some implementations, the increase in the compression of the uncompressed or partially compressed data from a local device may include encoding conversion of the information conveyed by the uncompressed or partially compressed data.

In some implementations, the reduction of compression of the compressed data may include a reduction in dependencies among multiple units of data in the compressed data. In some implementations, the compressed data may include inter-frame video coding and the transformed data may exclude inter-frame video coding. In some implementations, one or more units of data in the transformed data may not be transmitted to a local device based on an amount of available bandwidth and/or network latency between the proxy device and the local device, and/or an amount of latency caused by decompression of the transformed data by the local device. The unit(s) of data not transmitted to the local device may not be depended on by other units of data in the transformed data.

In some implementations, the transformed data may include a mix of units of data of different levels of compression.

In some implementations, an extent of the reduction of the compression of the compressed data performed by the proxy device may be dynamically adjusted based on (1) an amount of available bandwidth and/or network latency between the proxy device and the local device(s) and/or (2) an amount of latency caused by (a) the encoding conversion of the information by the proxy device and/or (b) decompression of the transformed data by the local device(s).

In some implementations, an extent of the compression of data performed by the first local device before the compressed data is transmitted to the proxy device may be dynamically adjusted based on (1) an amount of available bandwidth and/or network latency between the proxy device and the local device(s) and/or (2) an amount of latency caused by (a) the compression of data by the first local device and/or (b) the encoding conversion of the received data by the proxy device.

In some implementations, an extent of the increase in the compression of the received data performed by the proxy device may be dynamically adjusted based on (1) an amount of available bandwidth and/or network latency between the proxy device and the remote device(s) and/or (2) an amount of latency caused by (a) the encoding conversion of the information by the proxy device and/or (b) decompression of the transformed data by the remote device(s).

In some implementations, an extent of the reduction of the compression of the compressed data performed by the proxy device may be dynamically adjusted based on operation of the local device(s) in an interactive mode or a non-interactive mode. The operation of a local device in the interactive mode or the non-interactive mode may be determined based on monitoring of user input associated with the local device. The extent of the reduction of the compression of the compressed data performed by the proxy device may be reduced responsive to the operation of the local device in the non-interactive mode. The reduction of the extent of the reduction of the compression of the compressed data performed by the proxy device may include the reduction of the compression of the compressed data being turned off until the operation of the local device switches from the non-interactive mode to the interactive mode.

In some implementations, a local device and a remote device may be originally configured to communicate using a communication protocol. The proxy device may be configured to communicate with the remote device using the communication protocol on behalf of the local device. Similarly, the proxy device may be configured to communicate with the local device using the communication protocol on behalf of the remote device. The proxy device being configured to communicate with the remote device and/or the local device using the communication protocol may enable the proxy device to be integrated into an original (e.g., existing) client-server architecture of the local device and the remote device.

In some implementations, the proxy device and one or more other proxy devices may form a hierarchical network of proxy devices. The hierarchical network of proxy devices may be configured to provide a multi-stage reduction of and/or increase in the compression of the data for the set of local devices.

In some implementations, the proxy device may be configured to distribute the transformed data to multiple local devices. Individual local devices may provide output based on portions of the transformed data received by the individual local devices. The output of the individual local devices may be multiplexed into a single stream of data.

In some implementations, the proxy device may be configured to distribute the transformed data to the first local device and one or more other local devices. The other local device(s) may process received portions of the transformed data in parallel. The portions of the transformed data processed by the other local device(s) may be transmitted to the first local device.

In some implementations, the software and/or hardware components of the proxy device may form a processing pipeline for receiving data from a remote device or a local device, transforming the received data, and sending the transformed data to the local device or the remote device, respectively.

In some implementations, the proxy device may be configured to organize multiple local devices as members of a union. The proxy device may represent the union as a virtual device that has a set of virtual peripheral devices, e.g. keyboard, mouse, monitor, printer, etc. The set of virtual peripheral devices may represent a set of physical peripheral devices connected to the local devices. For example, individual virtual peripheral devices may correspond to one or more physical peripheral devices of one or more members of the union. The proxy device may communicate the set of virtual peripheral devices to a remote device on behalf of the union. For example, in a remote desktop application, the proxy device may be connected to two local devices. The proxy device may be configured to have two virtual monitors. Each virtual monitor may correspond to a physical monitor of one of the two local devices. The proxy device may communicate with a remote desktop server as a virtual client device on behalf of the two local devices. The proxy device may receive display information from the remote server for the two virtual monitors. The proxy device may relay the display information for each virtual monitor to a corresponding physical monitor of one of the two local devices.

In some implementations, the proxy device may be configured to allow the user to control multiple peripheral devices of the members of the union as if the multiple peripheral devices were connected to a single virtual device. For example, the proxy device may be connected to two local devices as members of a union. One of the two local devices may be connected to a pointing device, e.g. a mouse. Each local device may be connected to a physical monitor. The proxy device may receive user input to the pointing device from the corresponding local device. The proxy device may communicate with the two local devices to draw a cursor of the pointing device accordingly on the physical monitors such that both monitors may appear to be connected to a single virtual device and that the pointing device may appear to traverse both monitors.

In some implementations, two or more of the local devices may include same type of local devices. In some implementations, two or more of the local devices may include different types of local devices.

In some implementations, the set of local devices may include a laptop and a smartphone. The set of virtual peripheral devices communicated by the proxy device to the remote device may include a first virtual monitor corresponding to a display of the laptop and a second virtual monitor corresponding to a display of the smartphone. In some implementations, the set of virtual peripheral devices communicated by the proxy device to the remote device may further include a first virtual input device corresponding to a keyboard of the laptop, a second virtual input device corresponding to a touchpad of the laptop, a third virtual input device corresponding to a virtual keyboard of the smartphone, and a fourth virtual input device corresponding to a virtual touchpad of the smartphone.

In some implementations, the set of virtual peripheral devices communicated by the proxy device to the remote device may further include a virtual speaker device. The virtual speaker device may have a first virtual channel corresponding to a channel of a speaker of the laptop and a second virtual channel corresponding to a channel of a speaker of the smartphone. The proxy device may receive audio information from the remote device. The proxy device may relay a portion of the audio information corresponding to the first virtual channel to the laptop and relay a portion of the audio information corresponding to the second virtual channel to the smartphone.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
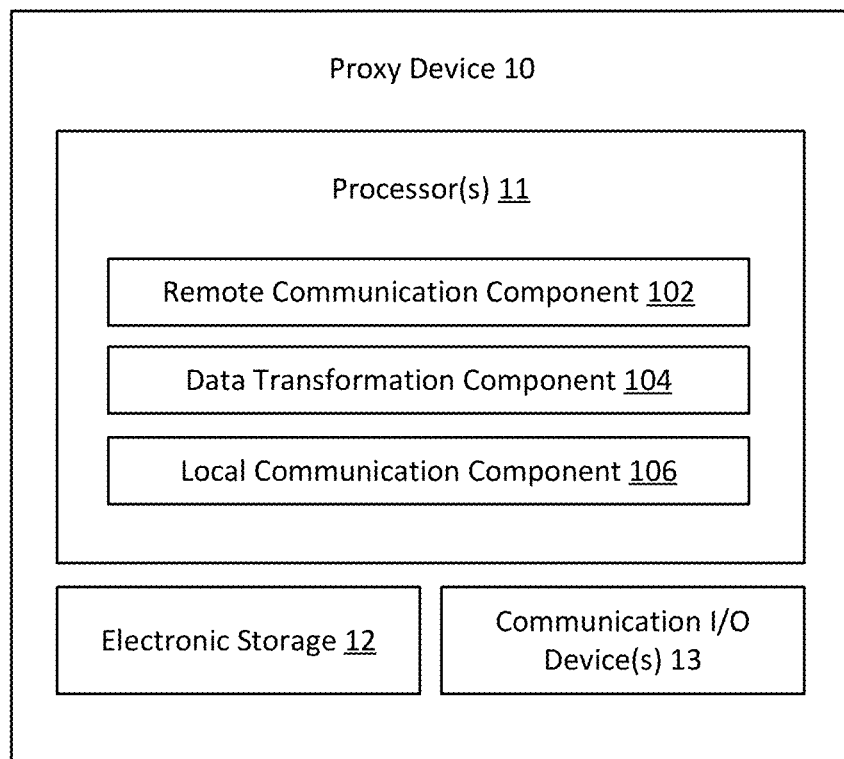
FIG. 1 illustrates an example proxy device that changes compression of data for a set of local devices, in accordance with various implementations of the disclosure.

This disclosure relates to systems and methods for sharing a resource for transforming data that reduces data compression/decompression to be performed by local devices in a network application. FIG. 1 illustrates an example proxy device 10. The proxy device 10 may be directly and/or indirectly connected to a set of local devices and a set of remote devices. The set of local devices may include a first local device, a second local device, and/or other local devices. The set of remote devices may include a first remote device and/or other remote devices.

In some implementations, the proxy device 10 may be configured to reduce compression of data transmitted by a remote device for one or more local devices. The proxy device 10 may reduce the compression of the data by receiving compressed data from the remote device. The received/compressed data may convey information. The proxy device 10 may generate transformed data based on reduction of compression of the received/compressed data. The proxy device 10 may transmit the transformed data to at least one local device of the set of local devices. Transmission of the transformed data to the local device(s) may enable the local device(s) to use the information without performing decompression of the received/compressed data. In other words, the proxy device 10 may perform some or all of the data decompression that would otherwise be performed by the local device(s). Multiple local devices may time-share the proxy device 10 for the reduction of compression of data. The reduction of compression of data for one local device may be independent of the reduction of compression of data for another local device.

In some implementations, the proxy device 10 may be configured to increase compression of data transmitted by a local device for one or more remote devices. The proxy device 10 may increase the compression of the data by receiving uncompressed or compressed data from the local device. The received data may convey information. The proxy device 10 may generate transformed data based on increase in compression of the received data. The proxy device 10 may transmit the transformed data to at least one remote device of the set of remote devices. Transmission of the transformed data to the remote device(s) may require less bandwidth and/or shorter amount of time compared to transmission of the original data received from the local device. In other words, the proxy device 10 may perform some or all of the data compression that would otherwise be performed by the local device. Multiple local devices may time-share the proxy device 10 for the increase in compression of data. The increase in compression of data for one local device may be independent of the increase in compression of data for another local device.

The proxy device 10 may receive data and transmit data to the same remote device and/or to different remote devices. For example, the proxy device 10 may receive compressed data from a remote device for delivery to one or more local device, and the proxy device 10 may receive data from the local device(s) for delivery to the same remote device. As another example, the proxy device 10 may receive compressed data from a remote device for delivery to one or more local device, and the proxy device 10 may receive data from the local device(s) for delivery to a different remote device.

Figure 2:
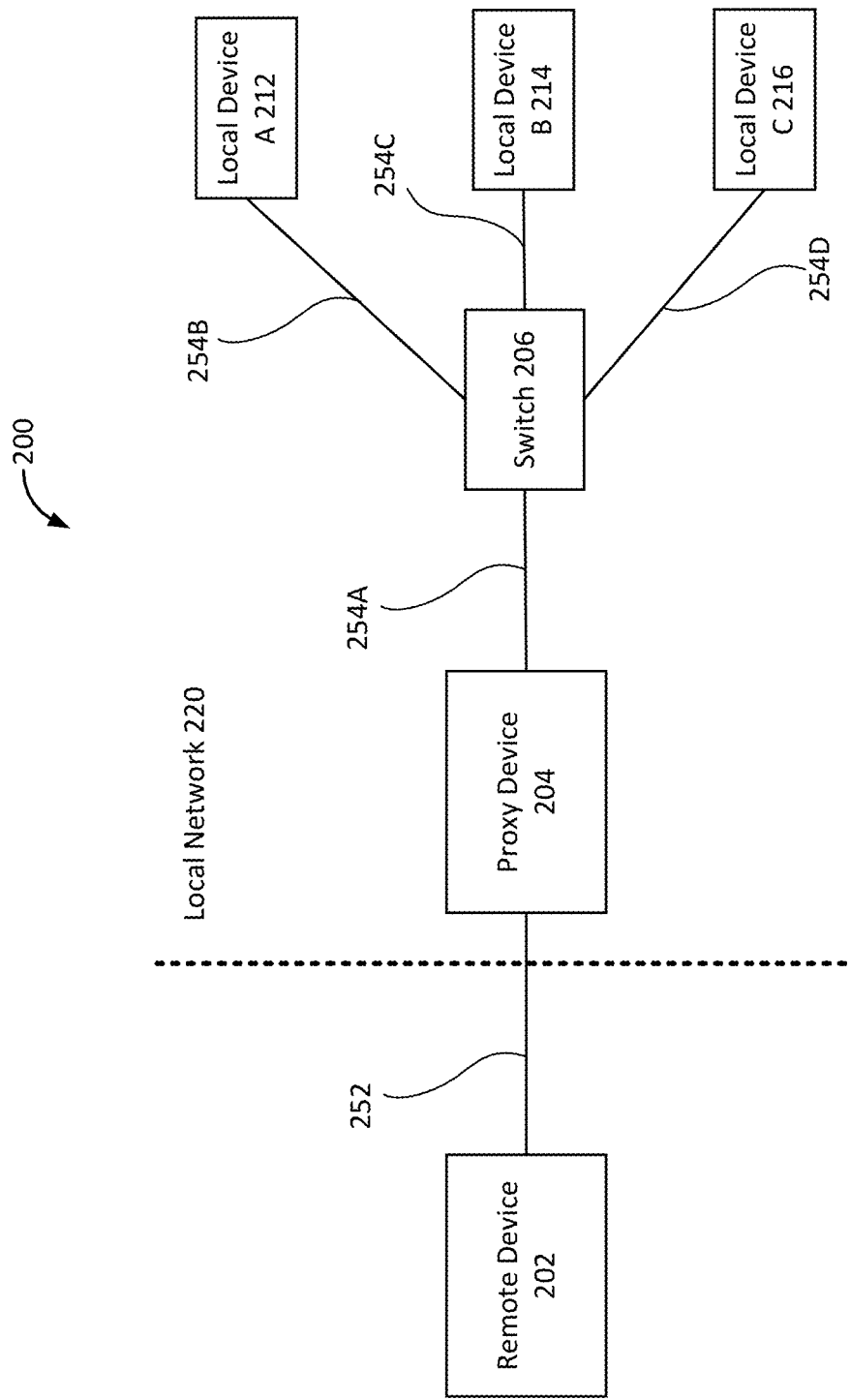
FIG. 2 illustrates example data paths between a remote device, a proxy device, and a set of local devices, in accordance with various implementations of the disclosure.

For example, FIG. 2 illustrate an example system 200. The system 200 may include one or more of a remote device 202, a proxy device 204, a switch 206, a set of local devices (the local device A 212, the local device B 214, the local device C 216), and/or other devices. The proxy device 204, the switch 206, and the local devices 212, 214, 216 may be located within a local network 220. The remote device 202 may be located outside the local network 220.

In some implementations, the proxy device 204, the remote device 202, and/or the local devices 212, 214, 216 may be in separate physical enclosures. A physical enclosure may refer to one or more physical materials to separate a device from other devices. For example, a physical enclosure may include one or more of walls, cases, boxes, compartments, slots, and/or other enclosures. In some implementations, one or more devices of the system 200 may be located within a single enclosure. For example, the proxy device 204 and the switch 206 may be contained within a single enclosure and/or two or more of the local devices may be contained within a single enclosure. As another example, one or more of the proxy device 204, the switch 206, and the local devices 212, 214, 216 may be separate devices contained within its own physical enclosure.

A remote device (e.g., the remote device 202) may refer to a computing device that is remote from a proxy device (e.g., the proxy device 204). A computing device being remote from a proxy device may include one or more data paths between the computing device and the proxy device having lower bandwidth and/or higher latency than one or more data paths between the proxy device and a local device. A computing device being remote from a proxy device may include the computing device and the proxy device being located within different networks.

A remote device may send/receive data conveying information (directly or indirectly) to/from other computing devices. A remote device may compress data conveying the information and/or receive compressed version of the data before sending the data to other computing devices. For example, a remote device may obtain data conveying information to be sent to a proxy device. Before sending the data through one or more data paths between the remote device and the proxy device, the remote device may compress the data. As another example, the remote device may obtain compressed version/copy of the data for transmission to the proxy device. The information conveyed by the data may enable a computing device to (e.g., local device) perform one or more functionalities. For example, the information contained within the data may be used by one or more components of the computing device to perform one or more operations.

A local device (e.g., the local devices 212, 214, 216) may refer to a computing device that is local to a proxy device (e.g., the proxy device 204). A computing device being local to a proxy device may include one or more data paths between the computing device and the proxy device having higher bandwidth and/or lower latency than one or more data paths between the proxy device and a remote device. A computing device being local to a proxy device may include the computing device and the proxy device being located within the same network.

A local device may receive/send data conveying information (directly or indirectly) from/to other computing devices. A local device may compress data conveying the information and/or receive compressed version of the data before sending the data to other computing devices. For example, a local device may obtain data conveying information to be sent to a proxy device. Before sending the data through one or more data paths between the local device and the proxy device, the local device may compress the data. As another example, the local device may obtain compressed version/ copy of the data for transmission to the proxy device. The information conveyed by the data may enable a computing device (e.g., remote device) to perform one or more functionalities. For example, the information contained within the data may be used by one or more components of the computing device to perform one or more operations.

In some implementations, a local device may include a resource-limited computing device. A resource-limited computing device may refer to a computing device that has limited amount of processing capability, processing speed, memory, power, and/or other resources for processing information. A resource-limited computing device may have less resources than a full-feature computing device. For example, a local device may include a zero-client device, a thin client device, and/or other resource-limited client devices.

A proxy device (e.g., the proxy device 204) may refer to a computing device that changes compression of data for a set of local devices. A change in compression of data may include reduction in compression of data and/or increase in compression of data. For example, the proxy device may receive compressed data from a remote device. The compressed data may convey information for the set of local devices. The compressed data may convey the information using data compression. Data compression may refer to encoding of information to reduce the number of bits needed to represent the data. For example, data conveying information for the local device A 212 may be compressed by the remote device 202 before transmission. The compression of the data may reduce its size (the size of the compressed data is smaller than the size of the original data). The reduced size of the compressed data may allow the compressed data to travel more quickly through one or more data paths between the remote device 202 and the local device A 212 and/or consume less bandwidth of the data path(s). However, the local device A 212 may not have sufficient resources to decompress the data quickly. For example, the local device A 212 may not have sufficient processing speed, processing capability, memory, and/or power to decompress the data and/or to decompress the data in a timely manner.

The proxy device 204 may perform the reduction of the compression of the compressed data for the local device A 212. Reduction of the compression of data may include decreasing the extent of the compression of the data. The extent of the compression of the data may refer to a degree to which the data is compressed. For example, an extent of the compression of the data may include how much of the information conveyed by the data is compressed and/or the level of compression performed for the information. The proxy device 204 may reduce the compression of compressed data by decompressing one or more portions of the compressed data, performing one or more steps of decompression of the compressed data, and/or by changing the compression scheme for the compressed data. For instance, the proxy device 204 may decompress some of the information while leaving the compression of other information conveyed by the data. Alternatively, and/or in addition, the proxy device 204 may perform some of the steps required to decompress the data and allow the local device A 212 to perform the remaining steps to decompress the data. The remote device 202 may compress the data for the local device A 212 using a high-compression technique that reduces the size of the compressed data while requiring greater resources to decompress the data. The proxy device 204 may change the compression into a lower-compression technique that increases the size of the compressed data while requiring less resource to decompress the data.

Reduction of the compression of data by the proxy device may include full decompression such that the local device need not perform any decompression to use the information conveyed by the data. Reduction of the compression of data by the proxy device may include partial decompression such that the local device need not perform as much decompression to use the information conveyed by the data.

As another example, the proxy device may receive data from a local device. The data may convey information for the set of remote devices. The data may be uncompressed data and/or compressed data (compressed by the local device before transmission to the proxy device). For example, data conveying information for the remote device 202 may be transmitted by the local device A 212. However, the local device A 212 may not have sufficient resources to compress the data quickly and/or to the extent desired. For example, the local device A 212 may not have sufficient processing speed, processing capability, memory, and/or power to compress the data and/or to compress the data in a timely manner and/or to the extent desired to reduce the consumption of bandwidth of the data path(s) between the local device A 212 and the remote device 202.

The proxy device 204 may increase the compression of the data for the local device A 212. Increase in the compression of data may include increasing the extent of the compression of the data. Increasing the extent of the compression of the data may include transforming uncompressed data into compressed data and/or increasing compression of already compressed data. The proxy device 204 may increase the compression of compressed data by compressing one or more portions of the data, performing one or more steps of compression of the data, and/or by changing the compression scheme for the data. For instance, the proxy device 204 may compress some of the information. Alternatively, and/or in addition, the local device A 212 may perform some of the steps to compress the data and the proxy device 204 may perform the remaining steps required to compress the data. The local device A 212 may compress the data for the remote device 202 using a low-compression technique. The proxy device 204 may change the compression into a higher-compression technique that reduces the size of the compressed data while requiring greater resource to decompress the data.

The proxy device 204 may be communicatively connected to the remote device 202 and the local devices (the local devices 212, 214, 216). The connection between the devices/components of the system 200 may include wired connection and/or wireless connection. The connection between the devices/components of the system 200 may include direct connection and/or indirect connection. For example, the proxy device 204 may be indirectly connected to the local devices via the switch 206. Connections between the devices/components of the system may form data paths for the devices/components. A data path may refer to a route, track, and/or other path by which data may travel. A data path may include data traveling along a single direction or multiple directions.

For example, one or more connections between the remote device 202 and the proxy device 204 may form a data path 252. The remote device 202 may use the data path 252 to send data to the proxy device 204 and/or receive information from the proxy device 204, and vice versa. One or more connections between the proxy device 204 and the switch 206 may form a data path 254A. One or more connections (direct connection(s) and/or indirect connection(s)) between the switch 206 and individual local devices (e.g., the local device A 212, the local device B 214, the local device C 216) may form data paths 254B, 254C, 254D. The proxy device 204 may use the data paths 254A, 254B, 254C, 254D to send data to the local devices and/or receive information from the local devices, and vice versa.

In some implementations, one or more data paths between the proxy device 204 and one or more local devices may have higher bandwidth and/or lower latency than one or more data paths between the proxy device 204 and the remote device 202. For example, the data paths 254A, 254B, 254C, 254D may have higher bandwidth and lower latency than the data path 252. The higher bandwidth and/or lower latency of the data paths 254A, 254B, 254C, 254D may be utilized/leveraged to reduce/eliminate the cost of computation (e.g., processing time, power, memory) for compression or decompression of data by the local devices. For example, data transformation performed by the proxy device 204 may increase the size of the data sent by the remote device 202 (e.g., data size/file size of the transformed data is larger than the data size/file size of the original data sent by the remote device 202), and the system 200 may take advantage of the high-bandwidth, low-latency network connection within the local network 220 to provide the transformed data in a timely manner to the local devices. As another example, the system 200 may take advantage of the high-bandwidth, low-latency network connection within the local network 220 by having the local devices 212, 214, 216 send uncompressed/lowly-compressed data to the proxy device 204 and the proxy device 204 may increase the compression of the received data and provide the transformed data to the remote device 202.

Cost-effective acceleration of data compression/decompression may be provided by the proxy device 204. The acceleration may be performed by the proxy device 204 connected to the local devices 212, 214, 216 over a high-bandwidth, low-latency network 220 (including data paths 254A, 254B, 254C, 254D). The proxy device 204 may be positioned at the end of the local network 220 and may be connected to the remote device 202 (including data path 252).

For example, the proxy device 204 may receive highly compressed data from the remote device 202 over a (wide-area) network, and either partially or fully decompress the data before sending the data to the local devices 212, 214, 216 over a high-bandwidth, low-latency network. The proxy device 204 may utilize/leverage the high-bandwidth, low-latency of the local network 220 by reducing the compression of the data before sending the data to the local devices 212, 214, 216.

As another example, the proxy device 204 may receive non-compressed/lowly-compressed data from the local devices 212, 214, 216 over a high-bandwidth, low-latency network, and increase the compression of the data before sending the data to the remote device 202. The proxy device 204 may utilize/leverage the high-bandwidth, low-latency of the local network 220 by receiving non-compressed/lowly-compressed data from the local devices 212, 214, 216.

The proxy device 204 may include sufficient computing resources (e.g., processing speed, processing capability, memory, power) to perform partial and/or full compression/decompression of data in a timely manner with respect to the latency requirement of a given application. The partial/full compression/decompression of data performed by the proxy device 204 may eliminate the need for the local devices 212, 214, 216 to include computing resources for the purposes of (fully) decompressing/compressing the data. Resource-limited computing devices may be used as the local devices 212, 214, 216 even when the remote device 202 provides information using high compression and/or when low-latency is required.

In the system 200, multiple local devices 212, 214, 216 may share the single proxy device 204. One or more of the local devices 212, 214, 216 may not be fully active at all times. For example, one or more of the local devices 212, 214, 216 may not require full stream of data from the remote device 202/the proxy device 204 at all times. Different activity of the local devices 212, 214, 216 may enable the proxy device 204 to be time-shared among the multiple local devices 212, 214, 216. Time-sharing of the proxy device 204 may include the multiple local devices 212, 214, 216 time-sharing the proxy device for the reduction of compression of data and/or increase in compression of data. Time-sharing of the proxy device 204 may include different reduction in compression of compressed data and/or different increase in compression of data by the proxy device 204 for the multiple local devices 212, 214, 216 at the same time. Time-sharing of the proxy device 204 may include utilization of the proxy device 204 by some of the local devices 212, 214, 216 and non-utilization of the proxy device 204 by others of the local devices 212, 214, 216 at the same time. Time-sharing of the proxy device 204 may include partial utilization of the proxy device 204 by some of the local devices 212, 214, 216 at the same time.

Figure 3:
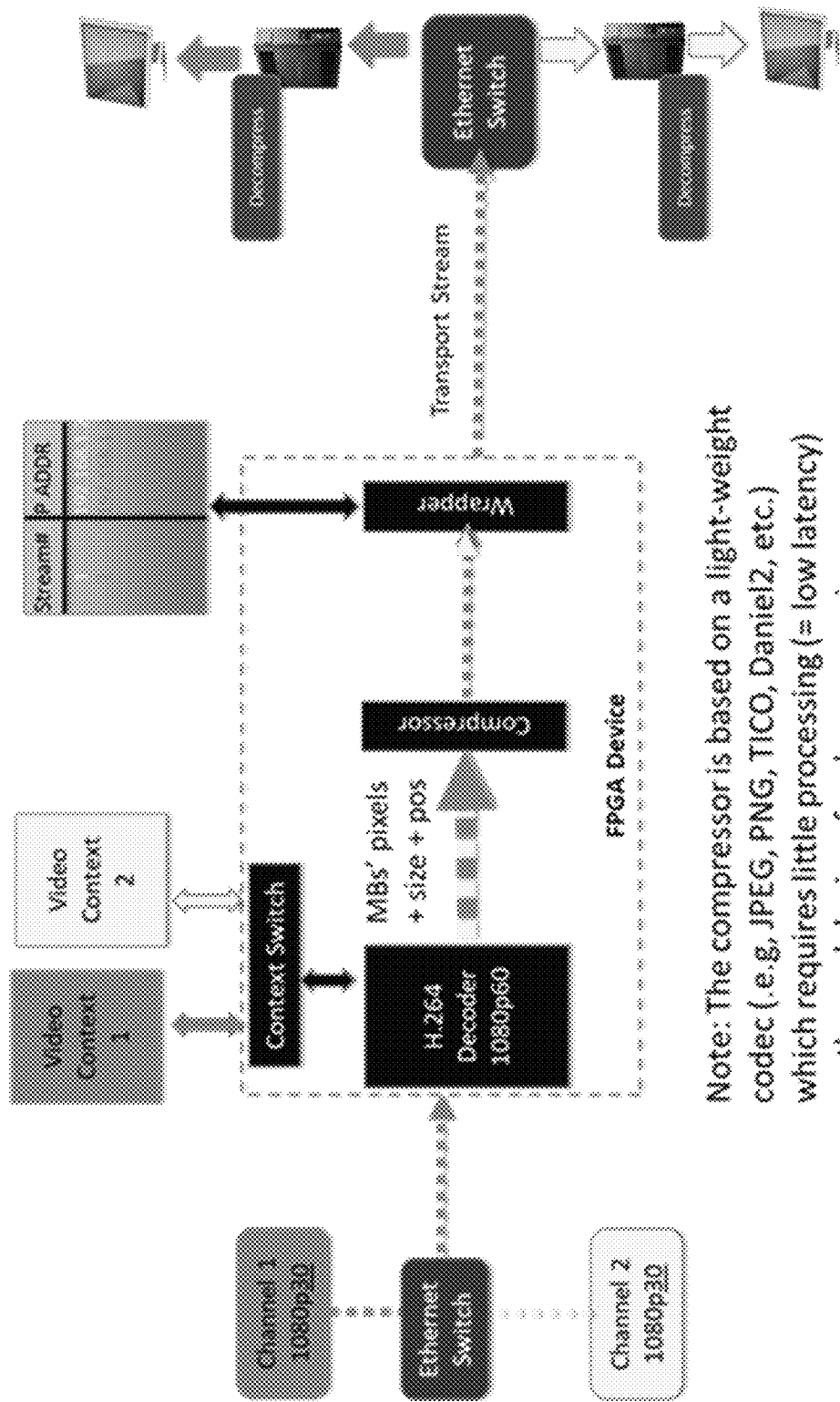
FIG. 3 illustrates an example interleaving of multiple channels, in accordance with various implementations of the disclosure.

For example, the proxy device 204 may process one or more portions of the data in a stream for individual local devices at a time and interleave the processing of multiple streams of data for the multiple local devices 212, 214, 216. FIG. 3 illustrates an example interleaving of multiple channels. The interleaving of multiple channels may effectuate time-sharing of the proxy device 204 by the multiple local devices 212, 214, 216.

The proxy device 204 may reduce the overall cost of the system. The average cost of a low-cost local device plus the cost of the proxy device 204, divided by the number of sharing local devices may be lower than the cost of a high-end local device equipped with adequate computing resources to perform low-latency decoding.

An example use-case for the system 200 includes application of the proxy-device architecture described herein for a remote desktop application. In a remote desktop application, user input to a local device may be sent to the remote desktop machine (the remote device 202). The remote desktop machine may render visual content (e.g., graphics, images, text) based on the user input. The rendered visual content may be captured, encoded, compressed and/or encrypted, and sent to the local device. The local device may decode, decompress, and/or decrypt the data and display the rendered visual content. The round-trip latency of the remote desktop application may include the time from the moment the local device receives the user input to the moment the local device displays the visual content. The remote desktop may be used for interactive application and it may be important to reduce/minimize the latency.

Both the remote device and the local device may be equipped with powerful hardware to speed up the rendering/capturing/compressing of the visual content (e.g., graphics data) on the remote side and the decoding of the visual content on the local side. It may be cost-effective to equip the remote device with powerful equipment as the remote hardware may be shared among multiple remote desktops which can be virtualized. It may be much less cost-effective to equip the local device with powerful hardware because each local device may be dedicated to a single user. That is, individual local devices may need to be equipped with powerful hardware to meet the low-latency requirement.

The proxy architecture described herein solves this problem by providing the powerful hardware on the local-side in a proxy device that is shared by multiple local devices. The proxy device may take advantage of two factors: (1) the connection between the proxy device and the local devices may (normally) have high bandwidth and/or low latency, and (2) each local device is typically not always fully active (i.e., video stream from the remote device to a local device may be sparse most of the time, such as in an office environment).

Another example use-case for the system 200 includes application of the proxy-device architecture described herein for a game streaming application. In a game streaming application, games may be run on powerful remote server hardware (e.g., in the cloud). The content (e.g., images, 3D shapes, object interactions, sounds) rendered for the games may be captured and/or compressed as a video stream and sent to local devices. However, local devices for game streaming (e.g., cloud gaming) may include devices without much processing power (speed, capability), such as tablets, smartphones, televisions, and/or other low-powered devices. In a game streaming application, a local network (home network) may include multiple local devices, and the user may switch between different local devices (e.g., between tablets, smartphones, television) from time to time, but when a local device is active, other local devices may be inactive. Alternatively, and/or in addition, different local devices may require different amount of utilization of the proxy device at the same time. Such use cases may allow a single proxy device to be time-shared among multiple local devices within the local network. Other use cases are contemplated.

The proxy device 204 may provide other functionalities for the local devices 212, 214, 216 and/or the remote device 202. For example, the data traffic to and/or from the proxy device 204 may be encrypted to prevent information from being hijacked. The proxy device 204 may perform some or all of the encryption functionalities for the local devices 212, 214, 216 and/or the remote device 202. As another example, the proxy device 204 may perform some or all of authentication functions for the local devices 212, 214, 216 and/or the remote device 202. As yet another example, the proxy device 204 may be configured to act as a gateway for one or more of the local devices 212, 214, 216 and facilitate establishment of connection with the remote device 202. For instance, when the local devices 212, 214, 216 need to establish a session with the remote device 202 (e.g., to receive data from the remote device 202), the local devices 212, 214, 216 may send a new session request to the proxy device 204. The proxy device 204 may, in turn, relay the session request to the remote device 202. The proxy device 204 may store credential information contained within the session request and/or other communication between the local devices 212, 214, 216 and the remote device 202 so that the proxy device 204 may establish/re-establish connections between the remote device 202 and the local devices 212, 214, 216 without having to request the credential information from the local devices 212, 214, 216.

In some implementations, the proxy device 204 may store and/or provide one or more system functionalities for the local devices 212, 214, 216. For example, the proxy device 204 may operate as an operating system-streaming server to enable the local devices 212, 214, 216 to perform network booting (e.g., PXE) and load its operating system over the local network 220 from the proxy device 204. The local devices 212, 214, 216 may operate as zero client devices. The local devices 212, 214, 216 may not have an operating system at rest and may have no local storage, resulting in a very secure device. Such local devices may be desirable in highly secure environments. At boot-up, the local devices 212, 214, 216 may download and/or stream the operating system (e.g., light weight OS) into its system memory. The operating system may enable the users to make a connection to one or more remote desktops. Such local devices may also eliminate the need to manage an operating system on the local-side (e.g., client-side), and thereby reduce the cost of running such a system.

In some implementations, the remote device 202, the proxy device 204, and the local devices may be located within the same network. The data path(s) between the proxy device 204 and the local devices 212, 214, 216, and the data path(s) between the proxy device 204 and the remote device 202 may have the same or similar bandwidth and/or latency.

While the system 200 is shown to include multiple local devices served by a single proxy device, this is merely as an example and is not meant to be limiting. A set of local devices served by a proxy device may include one or more local devices. For example, a proxy device may serve (provide decompression of data for) a single local device. Multiple proxy devices may serve a single local device or multiple local devices. While the system 200 is shown to include a proxy device connected to a single remote device, this is merely as an example and is not meant to be limiting. A proxy device may be connected to a single remote device or multiple remote devices. For example, a proxy device may be connected to a single remote device to relay information to one or more sets of local devices and/or may be connected to multiple remote devices to relay information to one or more sets of local devices.

In some implementations, one or more data paths between a proxy device and local devices may include one or more wireless components. For example, the local network 220 may include wireless components, such as WiFi connections and/or cellular connections. One or more proxy devices may be configured to serve one or more local devices based on the range of the wireless components. For example, a proxy device may be configured to serve local devices within a certain proximity of the proxy device and/or within certain bounding areas of the proxy device (e.g., within a room, building, neighborhood).

In some implementations, multiple proxy devices may be connected in a hierarchical topology. Individual proxy devices within the hierarchical topology may reduce and/or increase the compression of the received data. In such a case, a local device may include a proxy device that is positioned lowered in the hierarchical topology. For example, a proxy device that is at the top of the hierarchical topology may receive the compressed data from a remote device, perform some reduction of compression of the compressed data, and then send the partially-decompressed compressed data to the next proxy device in the hierarchical topology. The next proxy device in the hierarchical topology may perform some reduction of compression of the compressed data, and then send the twice partially-decompressed data to the next local device (e.g., another proxy device or a local device that needs the information conveyed by the compressed data to perform its function(s)). As another example, a proxy device that is at the top/bottom of the hierarchical topology may receive uncompressed data from a local device, perform some increase in compression of the data, and then send the compressed data to the next proxy device in the hierarchical topology. The next proxy device in the hierarchical topology may perform additional increase in compression of the compressed data, and then send the twice compressed data to the next device (e.g., another proxy device or a remote device).

Referring back to FIG. 1, the proxy device 10 may include one or more of processor(s) 11, electronic storage 12, communication I/O device(s) 13, and/or other components. The electronic storage 12 may include one or more electronic storage media that electronically stores information. Electronic storage 12 may store software algorithms, information determined by processor(s) 11, information received remotely, and/or other information that enables proxy device 10 to function properly. For example, electronic storage 12 may store information relating to service devices, information relating to local devices, information relating to data, information relating to compression of data, information relating to decompression of data, information relating to encoding of data, and/or other information.

The communication I/O device(s) 13 may include one or more circuits, memory, processor, interconnects, connectors, pins, logic, and/or other components that enable communication between different components/devices. The communication I/O device(s) 13 may include one or more network I/O devices which allows connections to one or more networks/devices/components using one or more communication protocols (e.g., network protocols, remote access protocols).

The processor(s) 11 may be configured to provide information processing capabilities in the proxy device. As such, the processor(s) 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor(s) 11 may be configured to facilitate the proxy device 10 to reduce and/or increase compression of data for a set of local devices. The processor(s) may include one or more processor components (e.g., software components and/or hardware components). The processor components may include one or more of a remote communication component 102, a data transformation component 104, a local communication component 106, and/or other processor components.

The processor(s) 11 may be configured by machine-readable instructions and/or include specialized hardware components to provide one or more functionalities described herein, such as reducing/increasing compression of data. For example, the processor(s) 11 may include one or more distinct hardware components configured to perform the reduction of the compression of the data, increase the compression of the data, and/or other functionalities described herein. In some implementations, a distinct hardware component may include one or more cores (e.g., intellectual property cores) inside hardware-implemented devices, such as field-programmable gate array devices and/or application-specific integrated circuit devices. As another example, the processor(s) 11 may be configured by software component (e.g., software modules) to perform one or more functionalities described herein. As yet another example, one or more functionalities described herein may be implemented in the processor(s) 11 via hardware while one or more other functionalities described herein may be implemented in the processor(s) 11 via software.

The remote communication component 102 may be configured to communicate with one or more remote devices. The remote communication component 102 may include and/or use one or more communication protocols to communicate with the remote device(s). The remote communication component 102 may use one or more of the communication I/O device(s) 13 to communicate with the remote device(s).

Communication with a remote device may include reception of data from the remote device and/or transmission of data to the remote device. Data may be directly and/or indirectly received from/transmitted to the remote device. For example, the remote communication component 102 may receive compressed data from a remote device. The compressed data may convey information, such as information intended for and/or to be used by one or more local devices. The remote communication component 102 may transmit data to a remote device. For example, the remote communication component 102 may relay data received from one or more local devices to a remote device and/or transmit data determined based on data received from one or more local devices to a remote device.

In some implementations, the remote communication component 102 may transmit data conveying user input and/or other information to a remote device. For example, a local device may transmit data conveying user input received at the local device (through one or more user interface devices of the local device, such as a keyboard, mouse, joystick, button/stick controller, motion controller, touchscreen, stylus, camera) to the proxy device 10 and the remote communication component 102 may transmit the data to the remote device. As another example, user input may be received at the proxy device 10 (through one or more user interface devices of the proxy device 10) and may transmit data conveying the user input to the remote device. In some implementations, data conveying some or all of the user input may bypass the proxy device 10 and may be transmitted to the remote device without going through the proxy device 10.

In some implementations, data transmitted by the remote communication component 102 to a remote device may include data received from one or more local devices responsive to the usage of the information conveyed by the compressed data by the local device(s). For instance, a local device may transmit data conveying information relating to operation of the local device based on data transmitted by a remote device, and the remote communication component 102 may relay the data to the remote device. Reception and transmission of other data/information by the remote communication component 102 are contemplated.

The data transformation component 104 may be configured to transform data received from one or more remote devices and/or one or more local devices. Transformation of data may include reduction of compression of data, increase in compression of data, encoding conversion of information conveyed by the data, reduction of encryption of data, increase in encryption of data, and/or other transformation of data. For example, the data transformation component 104 may generate transformed data based on reduction of compression of the compressed data received from a remote device and/or other information. Reduction of the compression of data may include decreasing the extent of the compression of the data (e.g., reducing amount of data that is compressed, performing one or more steps to decompress the compressed data, reducing the level of compression). The transformed data may be transmitted to one or more local devices. The transformed data may enable the local device(s) to use the information conveyed by the compressed data without performing decompression of the compressed data.

As another example, the data transformation component 104 may generate transformed data based on increase in compression of data received from a local device and/or other information. Increase in the compression of data may include increasing the extent of the compression of the data (e.g., increasing amount of data that is compressed, performing one or more steps to compress the data, increasing the level of compression). The transformed data may be transmitted to one or more remote devices. The transformed data may enable the proxy device 10 to relay information from a local device to a remote device with lower cost to the network.

As another example, the data transformation component 104 may generate transformed data based on reduction of encryption of the data received from a remote device and/or other information. For instance, the compressed data may be encrypted to prevent unauthorized access to the compressed data/information conveyed by the compressed data. Reduction of the encryption of data may include decreasing the extent of the encryption of the data (e.g., reducing amount of data that is encrypted, performing one or more steps to decrypt the data, reducing the level of encryption). The transformed data may be transmitted to one or more local devices. The transformed data may enable the local device(s) to use the information conveyed by the compressed data without performing decryption of the compressed data. In some implementations, reduction of the encryption of data may include conversion of the encryption scheme used to encrypt the data. For example, the data received from the remote device may be encrypted using a heavy encryption scheme that requires large consumption processing resources to perform decryption. The encryption scheme of the data may be changed to a light encryption scheme that requires less consumption of processing resources to perform decryption.

As yet another example, the data transformation component 104 may generate transformed data based on increase in encryption of data received from a local device and/or other information. Increase in the encryption of data may include increasing the extent of the encryption of the data (e.g., increasing amount of data that is encrypted, performing one or more steps to encrypt the data, increasing the level of encryption). In some implementations, increase in the encryption of data may include conversion of the encryption scheme used to encrypt the data (e.g., from a light encryption scheme to a heavy encryption scheme). The transformed data may be transmitted to one or more remote devices. The transformed data may enable the proxy device 10 to relay information from a local device to a remote device with lower cost to the local device.

The transformation of data by the data transformation component 104 may eliminate and/or reduce the need for the local devices to perform data transformation themselves. For example, reduction in compression of compressed data received from a remote device by the data transformation component 104 may enable the local device(s) receiving the transformed data to use the information conveyed by the data without performing decompression/decryption of the data and/or by performing less decompression/decryption of the data than would be necessary if the local device(s) received the compressed data transmitted by the remote device. As another example, increase in compression of data received from a local device by the data transformation component 104 may enable the local device to transmit data to the remote device (through the proxy device 10) without performing compression/encryption of the data and/or after performing less compression/encryption of the data. Thus, the transformation of data by the data transformation component 104 may reduce the amount of resource consumption required at the local device.

For example, video data (e.g., including image data, audio data) transmitted by a remote device to a local device may be compressed and/or encrypted. The proxy device 10 may receive the video data transmitted by the remote device. The proxy device 10 may reduce compression and/or encryption of the video data before transmitting the video data to the local device, which may reduce the amount of resource consumption required at the local device to use the video data. As another example, video data transmitted by a local device (e.g., camera device, such as a web camera) to a remote device may be received by the proxy device 10. The proxy device 10 may increase compression of the video data before transmitting the video data to the remote device, which may reduce the amount of cost to the network between the remote device and the local device/proxy device 10. The proxy device 10 may perform other transformations of data on the video data received from the local device, such as increasing encryption of the video data received from the local device.

Multiple local devices may time-share the proxy device 10 for the reduction of compression of data and/or the increase in compression of data. Time-sharing of the proxy device 10 by multiple local devices may include different reduction in compression of compressed data by the proxy device 10 for different local devices at the same time and/or different increase in compression of data by the proxy device 10 for different local devices at the same time. Time-sharing of the proxy device 10 by multiple local devices may include utilization of the proxy device 10 by one or more local devices and non-utilization of the proxy device 10 by one or more other local devices at the same time. Time-sharing of the proxy device 10 by multiple local devices may include partial utilization of the proxy device 10 by some local devices at the same time.

The reduction of and/or the increase in compression of data for one local device may be independent of the reduction of and/or the increase in compression of data for another local device. For example, the proxy device 10 may serve two local devices, and the reduction of and/or the increase in compression of data performed for one local device by the data transformation component 104 may be separate and not impacted by the reduction of and/or the increase in compression of data performed for the other local device by the data transformation component 104. For instance, the reduction in the amount of data that is compressed and/or reduction in the level of compression performed for one local device (e.g., one client) may not change based on the reduction in the amount of data that is compressed and/or reduction in the level of compression performed for the other local device (e.g., other client). The increase in the amount of data that is compressed and/or increase in the level of compression performed for one local device (e.g., one client) may not change based on the increase in the amount of data that is compressed and/or increase in the level of compression performed for the other local device (e.g., other client).

In some implementations, the reduction of the compression of the compressed data to generate the transformed data may include a full decompression. A full decompression may refer to complete reduction/removal of compression of the data. For example, the data transformation component 104 may reverse the compression on the compressed data such that the data is uncompressed. The full decompression may enable the local device(s) to use the information conveyed by the compressed data without performing decompression of the transformed data. That is, the full decompression may result in the transformed data conveying the information (conveyed by the compressed data received from the remote device) without any compression, and the local device(s) may use the information without decompressing the transformed data.

In some implementations, the reduction of the compression of the compressed data to generate the transformed data may include a partial decompression. A partial decompression may refer to partial reduction/removal of compression of the data. For example, the data transformation component 104 may partially reverse the compression on the compressed data such that the data is less compressed. The partial decompression may enable the local device(s) to use the information conveyed by the compressed data by performing decompression of the transformed data. The decompression of the transformed data may require consumption of less resources than the decompression of the compressed data. That is, the partial decompression may result in the transformed data conveying the information (conveyed by the compressed data received from the remote device) using less compression than the compressed data, and the local device(s) may use the information by decompressing the transformed data, with the lighter decompression of the transformed data requiring less consumption of resources than the decompression of the compressed data.

In some implementations, the reduction of the compression of the compressed data to generate the transformed data may include one or more encoding conversions of the information conveyed by the compressed data. Encoding may refer to conversion of information into a particular form/format. Encoding conversion (transcoding) may refer to change in the form/format used for the information. For example, data may have been compressed into compressed data based on encoding of the data using a heavy-weight compression codec. Encoding conversion of the information may include change in the compression codec for the information. For example, the data encoded using the heavy-weight compression codec may be converted so that the data is encoded using a light-weight compression codec. The conversion between the heavy-weight compression to the light-weight compression may include direct conversion (e.g., direct change from heavy-weight compression to light-weight compression) and/or indirect conversion (e.g., change from heavy-weight compression to no compression to light-weight compression). The encoding conversion may enable the local device(s) to use the information conveyed by the data by decoding the encoding-converted data. The decoding of the encoding-converted data by the local device(s) may require consumption of less resources than the decompression of the compressed data.

In some implementations, the encoding conversion of the information conveyed by the compressed data may include a reduction in the inter-relationships/dependencies among multiple units of data in the compressed data. For example, modern video codecs such as H.264, H.265, VP9, etc. use both intra-frame coding to remove spatial redundancy (e.g., duplicated/similar blocks of pixels within a video frame) and inter-frame coding to remove temporal redundancy (e.g., duplicated/similar blocks of pixels in groups of adjacent frames). As a result, compressed data may include both I-frames and P/B-frames. The encoding conversion by the proxy device may include decoding of the compressed data and re-coding of the decoded data with new inter-frame coding but for smaller groups of frames. As another example, the encoding conversion by the proxy device may include decoding of the compressed data and re-coding of the decoded data with only intra-frame coding. For instance, in case of H.264, all the P-frames and B-frames may be converted to I-frames.

In some implementations, the encoding conversion may further include decoding of intra-frame coded data which may result in the transformed data consisting of only intra-slice coding. An I-frame may be broken into multiple independent slices, with individual slices containing coding information to remove spatial redundancy among groups of pixels of a few horizontal lines of pixels within a frame that make up the slice. The coding of one slice may be independent of other slices. That is, an independent slice of an I-frame may not require other slice(s) of the I-frame to be decoded.

In some implementations, depending on factors including the processing power of a local device (or a remote device) and/or the bandwidth and latency of the connection between the proxy device and the local device (or the remote device), the proxy device may periodically skip one or more units of data, which are not depended on by other units of data, in the transformed data by not sending them to the local device (or the remote device). For example, after transforming the H.264 data (consisting of I/B/P-frames) received from a remote device into only I-frames in the transformed data, the proxy device may periodically skip a few I-frames. The proxy device may be configured to perform skipping for a newly generated I-frame if the frame is ready to be sent to a local device but the local device is still busy processing a previous frame. Such skipping of data may help avoid buffer overflow at the local device while keeping the pictures displayed at the client device as up to date as possible. Such skipping of data may cause the video displayed at the local device to appear choppy but there will be no data corruption at the local device because other frames received and processed by the local device are not dependent on the skipped frames.

In some implementations, the increase in the compression of the uncompressed or partially compressed data from a local device to generate the transformed data may include one or more encoding conversions of the information conveyed by the uncompressed or partially compressed data. For example, data may have been encoded using a low-weight compression codec. Encoding conversion of the information may include change in the compression codec for the information. For example, the data encoded using the low-weight compression codec may be converted so that the data is encoded using a heavy-weight compression codec. The conversion between the low-weight compression to the heavy-weight compression may include direct conversion (e.g., direct change from low-weight compression to heavy-weight compression) and/or indirect conversion (e.g., change from low-weight compression to no compression to heavy-weight compression). The transmission of the encoding-converted data by the proxy device to the remote device(s) may require consumption of less resources (e.g., bandwidth) than the transmission of the uncompressed or partially compressed data received from the local device(s).

In some implementations, an extent of the reduction of and/or the increase in compression of data performed for a local device by the proxy device may depend on amount of computing resources available at the local device. For example, the data transformation component 104 may dynamically adjust the extent of compression reduction/ increase performed for a local device based on how much computing resources are available at the local device to decompress/compress the data while respecting latency constraints. Greater extent of compression reduction/increase may be performed for local devices with less computing resources and smaller extent of compression reduction/increase may be performed for local devices with greater computing resources.

In some implementations, the extent of the reduction of and/or the increase in compression of data performed for a local device by the proxy device may depend on the identity and/or type of the local devices. For example, different reduction of and/or increase in compression of data may be performed for different local devices and/or different types of local devices. The data transformation component 104 may dynamically adjust the extent of compression reduction/increase performed based on the local devices being served.

In some implementations, an extent of the reduction of the compression of the compressed data (e.g., compression level reduction, encoding conversion) performed by the proxy device may be dynamically adjusted based on (1) an amount of available bandwidth and/or network latency between the proxy device and the local device(s), (2) an amount of latency caused by (a) the encoding conversion of the information by the proxy device and/or (b) decompression of the transformed data by the local device(s), and/or other information. For example, the data transformation component 104 may dynamically adjust the extent of compression reduction performed for a local device based on how much bandwidth is available between the local device and the proxy device 10, how long it takes for (how much latency is caused by) the local device to perform decoding of encoding-converted data, and/or how long it takes for (how much latency is caused by) the local device to perform decompression of the transformed data (e.g., partially decompressed data).

In some implementations, an extent of the increase in the compression of the received data (e.g., compression level increase, encoding conversion) performed by the proxy device may be dynamically adjusted based on (1) an amount of available bandwidth and/or network latency between the proxy device and the remote device(s), (2) an amount of latency caused by (a) the encoding conversion of the information by the proxy device and/or (b) decompression of the transformed data by the remote device(s), and/or other information. For example, the data transformation component 104 may dynamically adjust the extent of compression increase performed for a remote device based on how much bandwidth is available between the remote device and the proxy device 10, how long it takes for (how much latency is caused by) the proxy device to perform encoding-conversion of the data, and/or how long it takes for (how much latency is caused by) the remote device to perform decompression of the transformed data (e.g., data with increased compression).

In some implementations, an extent of the compression of data performed by the local device(s) before the compressed data is transmitted to the proxy device may be dynamically adjusted based on (1) an amount of available bandwidth and/or network latency between the proxy device and the local device(s), (2) an amount of latency caused by (a) the compression of data by the local device(s) and/or (b) the encoding conversion of the received data by the proxy device, and/or other information. For example, a local device may switch between sending uncompressed data or compressed data to the proxy device, or change the compression level performed before sending the compressed data to the proxy device based on how much bandwidth is available between the remote device and the proxy device 10, how long it takes for (how much latency is caused by) the local device to perform compression of the data, and/or how long it takes for (how much latency is caused by) the proxy device to generate the transformed data from the received data.

In some implementations, the proxy device may be configured to generate transformed data comprising a mix of units of data of different levels of compression. For example, the proxy device may be configured to transformed H.264 data received from a remote device into a sequence of I-frames (intra-coding) and raw frames (no compression) and send them to a local device. The ratio of I-frames vs. raw frames may be dynamically changed depending on various factors including (1) an amount of available bandwidth between the proxy device and the local device(s) and/or (2) an amount of latency caused by (a) the encoding conversion of the information by the proxy device and/or (b) decompression of the transformed data by the local device(s). For example, at one point in time the proxy device may send one raw frame for every two I-frames sent and at another point in time the proxy device may send one raw frame for every I-frame sent.

Such dynamic adjustment of the compression reduction/increase performed by the data transformation component 104 may provide a flexible trade-off between the available bandwidth/latency in the network(s), latency added due to decompression/compression and/or encoding conversion performed by the proxy device 10, and/or the latency added due to decompression/compression/decoding performed by the local device. Greater extent of compression reduction/increase may be performed for local devices based on (1) larger available bandwidth and/or smaller amount of network latency between the proxy device and the local device(s), (2) smaller amount of latency caused by (a) the encoding conversion of the information by the proxy device and/or (b) decompression/compression of data by the local device(s), and/or other information. Smaller extent of compression reduction/increase may be performed for local devices based on (1) smaller available bandwidth and/or larger amount of network latency between the proxy device and the local device(s), (2) larger amount of latency caused by (a) the encoding conversion of the information by the proxy device and/or (b) decompression/compression of data by the local device(s), and/or other information.

In some implementations, an extent of the reduction of the compression of the compressed data performed by the proxy device 10 may be dynamically adjusted based on operation of the local device(s) in an interactive mode, a non-interactive mode, and/or other modes. An interactive mode may refer to a mode of usage and/or operation of a local device in which the local device actively provides information to a remote device and the remote device uses the information provided by the local device to determine/adjust the information the remote device provides to the local device. For example, in a gaming application, an interactive mode may refer to a mode of usage and/or operation of a local device in which user inputs received at the local device (e.g., information on which buttons of a gaming controller was engaged by the user to provide inputs for a game) may be provided by the local device to a remote device, and the remote device may change the game (e.g., change what objects are rendered in the game, cause interaction between objects in the game) based on the user inputs.

An interactive mode may refer to a mode of usage and/or operation of a local device in which the local device provides information to the remote device with a certain amount of frequency. For example, a local device may operate in an interactive mode based on the local device providing particular information (e.g., user inputs) to the remote device at least once within a thirty-second period. Other time periods/ frequency are contemplated.

A non-interactive mode may refer to a mode of usage and/or operation of a local device in which the local device does not actively provide information to a remote device. For example, in a video streaming application, a non-interactive mode may refer to a mode of usage and/or operation of the local device in which user inputs received at the local device is not required to perform video streaming functionalities (e.g., receiving video data, rendering video data, playing video data).

A non-interactive mode may refer to a mode of usage and/or operation of a local device in which the local device does not provide information to the remote device with a certain amount of frequency. For example, a local device may operate in a non-interactive mode based on the local device not providing particular information (e.g., user inputs) to the remote device at least once within a thirty-second period. Other time periods/frequency are contemplated. For example, in a remote desktop application, the local device may operate in an interactive mode based on the local device regularly (e.g., at least once in thirty seconds) receiving user inputs through user interface device(s) (e.g., user actively interacting with software program provided by the remote device through the remote desktop application). The local device may operate in a non-interactive mode based on the local device not regularly receiving user inputs through user interface device(s) (e.g., user passively consuming content provided by the remote device through the remote desktop application). Thus, the local device may switch between the interactive mode and the non-interactive mode based on the application, user input, and/or other user interaction with the local device/the remote device.

The operation of a local device in the interactive mode, the non-interactive mode, and/or other modes may be determined based on monitoring of user input associated with the local device and/or other information. For example, the proxy device 10 may monitor user inputs associated with a local device to determine whether the local device is operating in the interactive mode or the non-interactive mode. In some implementations, the proxy device 10 may monitor the frequency with which the user inputs are provided at a local device to determine whether the local device is operating in the interactive mode or the non-interactive mode. Other determinations of the modes of operation of the local devices are contemplated.

Dynamically adjusting the extent of the reduction of the compression of the compressed data performed by the proxy device 10 based on operation of the local device(s) in an interactive mode, a non-interactive mode, and/or other modes may enable the proxy device 10 to change the amount and/or type compression reduction performed for different local devices based on the operation mode of the local devices. Dynamically adjusting the extent of the reduction of the compression of the compressed data performed by the proxy device 10 based on operation of the local device(s) in an interactive mode, a non-interactive mode, and/or other modes may enable the proxy device 10 to change the amount of processing resources utilized/dedicated to different local devices based on the operation mode of the local device.

For example, the extent of the reduction of the compression of the compressed data performed by the proxy device 10 for a local device may be reduced responsive to the operation of the local device in the non-interactive mode. The extent of reduction of the compression of the compressed data performed by the proxy device 10 for a local device may be increased responsive to the operation of the local device in the interactive mode.

Operation of the local device in the non-interactive mode may result in the local device having more available resources to decompress the data and utilize the information conveyed by the data. Operation of the local device in the non-interactive mode may result in latency not being important/as important as when the local device is operating in the interactive mode. The user of the local device may not notice the additional latency caused by the compression reduction performed by the proxy device 10 as long as the local device decompresses/decodes the compressed data in timely manner (e.g., quickly enough to avoid data congestion/loss).

In some implementations, the reduction of the extent of the reduction of the compression of the compressed data performed by the proxy device 10 may include the reduction of the compression of the compressed data being turned off for the local device until the operation of the local device switches from the non-interactive mode to the interactive mode. That is, the proxy device 10 may stop compression reduction (e.g., decompression/transcoding) of the compressed data and forward the compressed data received from the remote device based on the local device operating in the non-interactive mode. Selectively turning off the compression reduction of data for local devices operating in the non-interactive mode may enable the proxy device 10 to conserve its resources to serve locals devices operating in the interactive mode.

In some implementations, the proxy device 10 may transmit to and/or receive from a local device context data associated with the decompression, decoding, and/or transcoding of the data from the remote device to facilitate transition between different modes of operations and/or different compression reduction of the data. Context data may be used to ensure that no information is lost in the transition. For example, in the case of H.264 video decoding, the context data may include a few of the latest decoded video frames used as reference frames for decoding future frames. Such context data may be used to ensure that no frames and/or blocks of pixels are lost in the transition. Other context data are contemplated.

The local communication component 106 may be configured to communicate with one or more local devices. The local communication component 106 may include and/or use one or more communication protocols to communicate with the local device(s). The local communication component 106 may use one or more of the communication I/O device(s) 13 to communicate with the remote device(s).

Communication with a local device may include reception of data from the local device and/or transmission of data to the local device. Data may be directly and/or indirectly received from/transmitted to the local device. For example, the local communication component 106 may transmit transformed data (e.g., of compressed data received from the remote device(s)) to one or more local devices. The transformed data may enable the local device(s) to use the information conveyed by the compressed data without performing decompression of the compressed data. The local communication component 106 receive data from a local device. For example, the local communication component 106 may receive data to be relayed to a service device from a local device. As another example, the local communication component 106 may receive data from a local device and use the received data to determine data to be transmitted to a remote device.

In some implementations, the local communication component 106 may receive data conveying user input and/or other information from a local device. For example, the local communication component 106 may receive from a local device data conveying user input received at the local device. In some implementations, the local communication component 106 may receive data from a local device responsive to the usage of the information conveyed by the compressed data by the local device. For instance, the local communication component 106 may receive data conveying information relating to operation of the local device based on data transmitted by a remote device. Transmission and reception of other data/information by the local communication component 106 are contemplated.

In some implementations, a local device and a remote device may be originally configured to communicate using one or more communication protocols. The proxy device 10 (e.g., the remote communication component 102) may be configured to communicate with a remote device using the same communication protocol(s) on behalf of the local device. Similarly, the proxy device 10 may be configured to communicate with the local device using the communication protocol on behalf of the remote device. The proxy device 10 (e.g., the local communication component 106) may be configured to communicate with a local device using the same communication protocol(s). The proxy device 10 being configured to communicate with the remote device and/or the local device(s) using the communication protocol(s) used between the remote device and the local devices may enable the proxy device 10 to be integrated into an original (e.g., existing) client-server architecture of the local device(s) and the remote device. The communication protocol compatibility between the devices may enable the proxy device 10 to be integrated into an existing client-server architecture of a suitable application without modifying the existing communication protocol between the local devices and the remote device. For instance, the proxy device 10 may be integrated into an existing client-server architecture without modifications to the client software component that handles the communication protocol.

For example, the proxy device 10 may be configured to execute/run one or more instances of the client software component that runs on a local device in the original client-server architecture to communicate with the remote device using the same communication protocol. The proxy device 10 may run individual instances corresponding to individual local devices, and the instances may be isolated from each other in a container and/or a virtual machine running on the proxy device 10. When the client software component on the proxy device 10 calls a component (e.g., third party software component) to decode and/or decompress data received from the remote device, the call may be intercepted to retrieve the data. Compression reduction may then be performed on the data as described herein.

In some implementations, one or more add-on applications (e.g., Unified Communication for Remote Desktop) may exist within the existing client-server architecture. Such add-on application may be configured to run/execute on the proxy device 10 when the proxy device 10 is incorporated within the existing client-server architecture. The add-on application may be configured to run within one or more isolated environments (e.g., container, virtual machine) of the associated instance of the client software component.

In some implementations, the proxy device 10 may be configured with one or more virtual input devices, such as in the form of virtual device drivers. Such virtual input devices may be used for client software components and/or add-on applications running on the proxy device 10 that requires user input. In some implementations, multiple instances of such virtual input device(s) may be executed/run, with virtual input devices within individual instances associated with an instance of the client software component/add-on application and with a local device. User inputs provided through the local device/separate controller may be transmitted to the proxy device 10 and relayed to the appropriate client software component via the virtual device driver(s).

In some implementations, the proxy device 10 may include (dedicated) hardware that is specialized for one or more particular types of decoding, encoding, compression, decompression, transcoding, and/or encryption. For example, the proxy device 10 may include one or more field-programmable gate array devices and/or application-specific integrated circuit devices that are configured specifically for transcoding video data from H.264 to a light-weight codec, such as M-JPEG.

In some implementations, the proxy device 10 may include a single distinct hardware component (e.g., general purpose processor, a physical FPGA device, a physical ASIC device, a logical IP core inside an FPGA/ASIC device) configured to support multiple data streams at the same time (interleaved or in parallel) for one or more local devices. In some implementations, the proxy device 10 may have one or more of such distinct hardware components.

In some implementations, one or more functions of the proxy device 10 may be divided into sub-functions implemented by distinct hardware components and/or distinct software components, referred to as distinct functional components. The distinct functional component may be configured to form a pipeline that receive data from a remote device, generates transformed data based on the received data, and transmits the transformed data to a local device, and/or vice versa (pipeline for movement of data from a local device to a remote device). For example, one or more of the software and/or hardware components of the proxy device 10 may form a processing pipeline for receiving data from a remote device or a local device, transforming the received data, and/or sending the transformed data to the local device or the remote device, respectively. A pipelining architecture may be particularly useful for the techniques disclosed herein as decompressed data may become very large in size and passing of the decompressed data back and forth among the components over the system buses may saturate the system buses. An example pipeline of functional components inside a proxy device is shown in FIG. 4.

Figure 4:
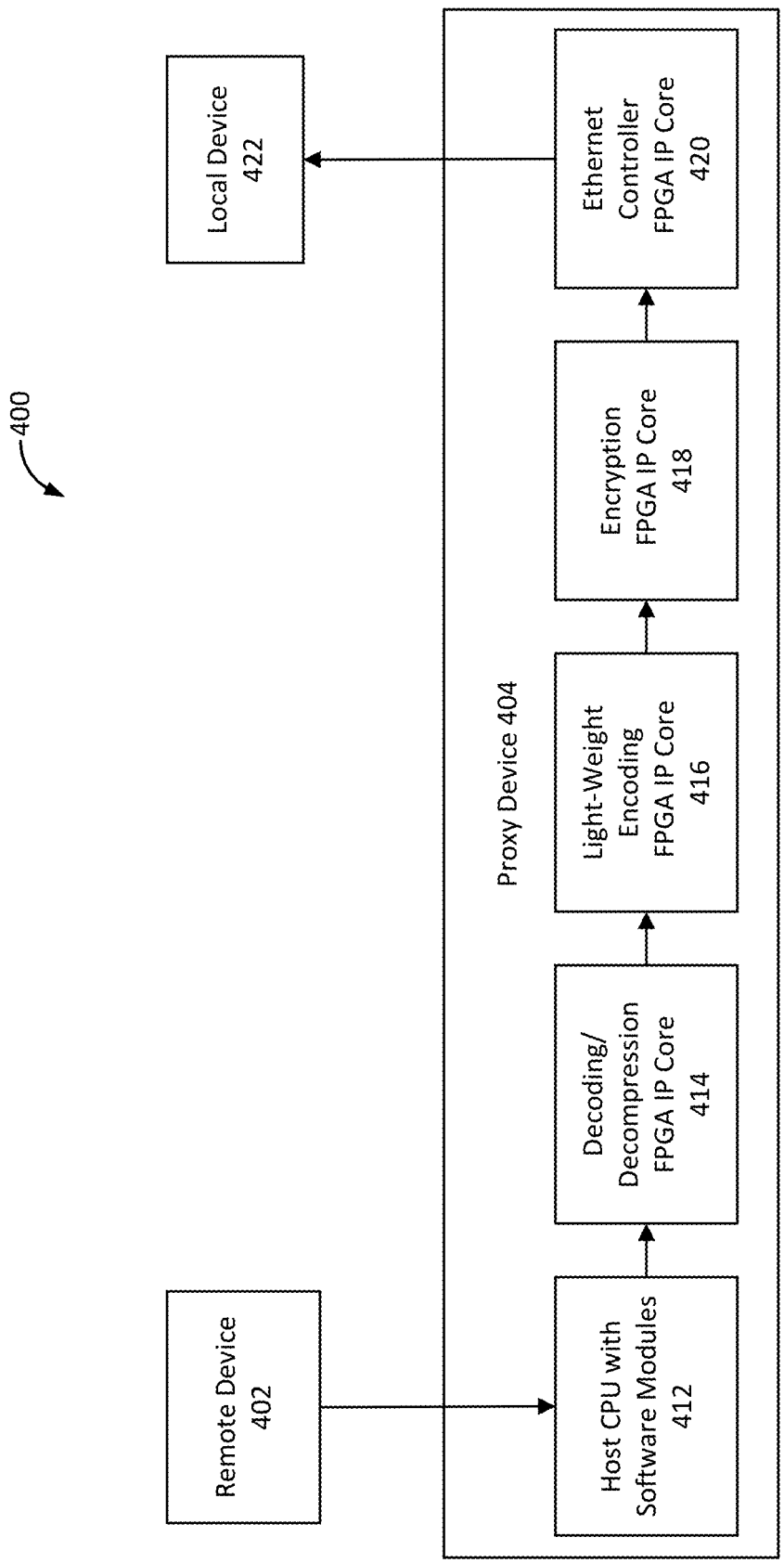
FIG. 4 illustrates an example pipeline of data from a remote device to a local device via a proxy device, in accordance with various implementations of the disclosure.

FIG. 4 illustrates an example pipeline 400 of data from a remote device 402 to a local device 422 via a proxy device 404. The data transmitted by the remote device 402 may be received by a host CPU with software modules 412. The data may be decoded and/or decompressed by a decoding/decompression FPGA IP core 414. The data may then be encoded (transcoded) by a light-weight encoding FPGA IP core 416. The data may be encrypted by an encryption FPGA IP Core 418 before the data is transmitted to the local device 422 by an ethernet controller FPGA IP core 420. Other pipeline of data and other distinct hardware/software components are contemplated.

In some implementations, multiple proxy devices may serve multiple local devices. For example, multiple proxy devices may serve (e.g., provide decompression/transcoding) for overlapping sets of local devices. Load-balancing may be performed among the proxy devices/components of proxy devices to serve one or more local devices. For instance, load-balancing may be performed among distinct hardware components of the proxy devices for one or more local devices.

For example, a hardware component of a first proxy device may be serving more highly active local devices than a hardware component of a second proxy device. Context data associated with a highly active local device of the hardware component of the first proxy device may be transferred to the hardware component of the second proxy device. New data transmitted by a remote device for the highly active local device may be transmitted to the hardware component of the second proxy device, rather than the hardware component of the first proxy device, for decompression/transcoding before it is transmitted to the highly active local device.

For instance, in a remote desktop application, the graphics of the remote desktop may be encoded into a video stream (e.g., H.264 video stream) and transmitted to the local device. When a proxy device is configured to receive the video stream in place of the local device, the proxy device may store and update context data necessary to decode new frames of the video stream. The context data may include one or more of the latest decoded video frames (e.g., up to the latest 16 decoded video frames). When load-balancing is performed, the proxy device may transmit the context data to another proxy device and direct the remote device to send subsequent data (e.g., the next frames) to the other proxy device. The other proxy device may use the context data received from the original proxy device to decode the new data (e.g., new video frames) from the remote device before sending the transformed (e.g., decompressed) data to the local device. This may ensure that no data (e.g., video frames) are lost in the transition between proxy devices/components of proxy devices.

In some implementations, the proxy device 10 and one or more other proxy devices may form a hierarchical network of proxy devices. A hierarchical network of proxy devices may refer to a network of proxy devices in which proxy devices are connected in an order. The hierarchical network of proxy devices may be configured to provide a multi-stage reduction of and/or increase in the compression of data for a set of local devices. Multi-stage reduction of and/or increase in compression of data may include different proxy devices performing different parts of the compression reduction/increase (e.g., decompression, compression, transcoding). For example, proxy devices within different levels of hierarchy within the hierarchical network of proxy devices may perform different portions/types of compression reduction/increase before passing the data onto one or more proxy devices within another (lower) level within the hierarchical network of proxy devices.

Figure 5:
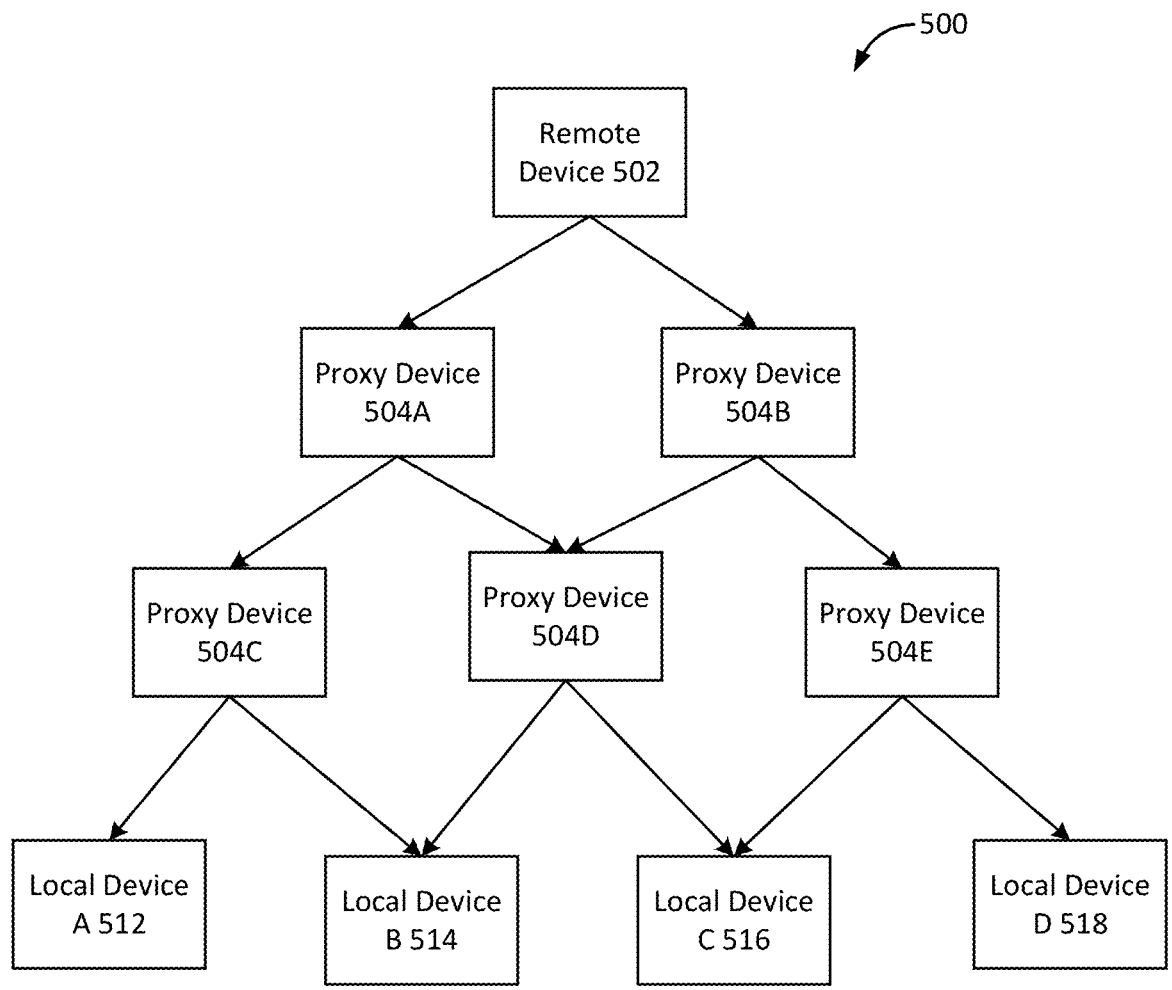
FIG. 5 illustrates an example hierarchical network of proxy devices, in accordance with various implementations of the disclosure.

FIG. 5 illustrates an example hierarchical network of proxy devices 500. In the hierarchical network of proxy devices 500 may include two different levels/stages of proxy devices. The first level/stage of proxy devices may include proxy devices 504A, 504B. The second level/stage of proxy devices may include proxy devices 504C, 504D, 504E. The proxy devices 504A, 504B, 504C, 504D, 504E may be identical devices (e.g., all proxy devices have same processor components, memory components, hardware components, software components) or may be different devices (e.g., different proxy devices have different processor components, memory components, hardware components, software components).

Different levels/stages of the hierarchical network of proxy devices 500 may perform different parts of the compression reduction/increase. For example, the proxy devices 504A, 504B may receive compressed data from the remote device 502 and reduce data compression by a certain amount before passing the data to one or more of the proxy devices 504C, 504D, 504E. The proxy devices 504C, 504D, 504E may further reduce data compression of the data received from the proxy devices 504A, 504 before passing the data to one or more of the local devices 512, 514, 516, 518. As another example, the proxy devices 504A, 504B may perform decompression of compressed data received from the remote device 502 and the proxy devices 504C, 504D, 504E may perform transcoding of the decompressed data before transmitted the data to the local devices 512, 514, 516, 518. In some implementation, a proxy device and/or a local device may receive data from more than one higher-level proxy device for the same data stream. Data may flow in the other direction for cases in which the proxy devices are performing data compression on data going from the local devices 512, 514, 516, 518 to the remote device 502. Proxy devices in different levels may increase data compression by a certain amount before passing the data to proxy devices in a higher level. Other hierarchical networks of proxy devices are contemplated.

In some implementations, the proxy device 10 may organize data/information for multiple local devices. For example, the proxy device 10 may be connected to multiple local devices. Data from a remote device to different local devices may be received by the proxy device 10, and the proxy device 10 may relay the data/portions of the data to appropriate local devices. As another example, data from local devices may be received by the proxy device 10, which may relay the data/portions of the data to the remote device and/or other local devices. Such unionization/confederation/aggregation of data may be provided by the proxy device 10 for one or more applications, such as remote desktop application, cloud gaming application, and/or other applications.

In some implementations, the proxy device 10 may be configured to organize multiple local devices as members of a union. The proxy device 10 may represent the union as a virtual device that has a set of virtual peripheral devices (e.g., keyboard, mouse, monitor, printer, etc.). The set of virtual peripheral devices may be created to represent a set of physical peripheral devices connected to a set of local devices. Individual virtual peripheral devices may correspond to one or more physical peripheral devices of one or more members of the union. In some implementations, individual virtual peripheral devices may correspond to individual physical peripheral devices. The proxy device 10 may communicate the set of virtual peripheral devices to a remote device on behalf of the union. For example, in a remote desktop application, the proxy device 10 may be connected to two local devices. The proxy device 10 may be configured to have two virtual monitors. Each virtual monitor may correspond to a physical monitor of one of the two local devices. The proxy device 10 may communicate with a remote desktop server as a virtual client device on behalf of the two local devices. The proxy device may receive display information from the remote server for the two virtual monitors. The proxy device may relay the display information for each virtual monitor to a corresponding physical monitor of one of the two local devices.

For example, individual local devices may be connected to one or more monitors. The monitors connected to the multiple local devices may be used to provide a view of visual content (e.g., view of a remote desktop, view of image, view of video). The monitors may be driven by the local devices to provide duplicate views of the visual content (individual monitors providing same view of the visual content) or segmented views of the visual content (view of visual content divided among the monitors).

For example, the proxy device 10 may receive video data from a remote device. The proxy device 10 may reduce compression of the video data and/or otherwise transform the video data before sending the video data/portions of the video data to the local devices. For example, in instances in which the monitors are providing segmented view of the video, the proxy device 10 may send to a local device the portion(s) of the video data corresponding to the view(s) to be presented on the monitor(s) driven by the local device.

The video data may be split by the remote device and/or by the proxy device 10 for transmission to individual local devices. For example, the proxy device 10 may report to the remote device the number of local devices served by the proxy device 10, the number of monitors connected to the local devices, and/or the arrangement of monitors that are to display the segmented view of the video. The remote device may split the video data for individual local devices and/or individual monitors before transmitting the split video data to the proxy device 10. The proxy device 10 may relay the split video data (after data transformation) to the local devices.

As another example, the proxy device 10 may report to the remote device that that only a single monitor is being used to present the video when multiple local devices/monitors are being used to present the video. The remote device may transmit the video data for presentation on a single monitor to the proxy device 10, and the proxy device 10 may split the video data for individual local devices and/or individual monitors/monitor subsets before transmitting the split video data to the local devices. For the case in which multiple monitors are providing duplicate views of the video, the proxy device 10 may receive video data for presentation on a single monitor from the remote device, duplicate the video data for different local devices/monitors, and transmit the duplicated video data to the local devices.

In some implementations, the proxy device 10 may run one or more virtual display drivers. The virtual display driver(s) may be used to make the proxy device 10 appear to be a local device. For example, the proxy device 10 may be using a client software configured for a traditional client-server setup (e.g., traditional setup of a remote display application) to communicate with the remote device. The virtual display driver(s) may trick the client-software into thinking that the proxy device 10 is a "client" connected to monitors that are actually connected to the local devices. The proxy device 10 may run a virtual display driver for individual local devices, individual monitors, and/or individual monitor subsets. For example, the proxy device 10 may run a virtual display driver for individual monitors reported by the local devices. An individual monitor reported by a local device may include a physical monitor or a virtual monitor. A virtual monitor may correspond to one or more physical monitors. In implementations in which the proxy device 10 is part of a hierarchical network of proxy devices (e.g., such as shown in FIG. 5), a higher tier proxy device may aggregate monitors reported by a lower tier proxy device.

In some implementations, multiple local devices that are members of a union represented by the proxy device may be of different types of devices. For example, in a remote desktop application, the proxy device may be connected to a laptop and a smartphone. The proxy device may communicate to a remote device one virtual device that has two virtual monitors, one corresponding to the laptop's display and one corresponding to the smartphone's display.

In some implementations, the smartphone may have software to utilize at least a portion of the display screen as a virtual touchpad and/or at least a portion of the display screen as a virtual keyboard. The software may send user inputs to the proxy device. The proxy device may communicate to the remote device four virtual input devices, one corresponding to the laptop's keyboard, one corresponding to the laptop's touchpad, one corresponding to the smartphone's virtual keyboard, and one corresponding to the smartphone's virtual touchpad.

In some implementations, the proxy device may communicate to the remote device one virtual speaker device having multiple virtual channels, with individual virtual channels corresponding to one or more channels of local devices. For example, the virtual speaker device may have a first virtual channel corresponding to a channel of a speaker of the laptop and a second virtual channel corresponding to a channel of a speaker of the smartphone. The proxy device may receive audio information from a remote device and relay a portion of the audio information corresponding to the first virtual channel to the laptop and relays a portion of the audio information corresponding to the second virtual channel to the smartphone. As another example, the virtual speaker device may have 4 virtual channels, with 2 virtual channels corresponding to channels of speakers of the laptop device and 2 virtual channels corresponding to speakers of the smartphone. The proxy device may receive 4-channel audio information from the remote device and relay audio information of 2 of the 4 channels to the laptop and the other 2 of the 4 channels to the smartphone.

In some implementations, the proxy device may be configured to distribute transformed data to multiple local devices to take advantage of parallel processing. The output of the multiple local devices may be multiplexed into a single stream of data to convey coherent information. For example, the proxy device may receive H.264 data from a remote device and generate transformed data comprising only I-frames. The proxy device may be configured to send a first I-frame to a first connected local device and send a 2nd I-frame to a second connected local device. The local devices may be configured to decode the I-frames received from the proxy device into raw frames and output them to the same display switch (e.g., DisplayPort switch). The display switch may be configured to alternately receive raw frames from the local devices and output them in turn to a connected display screen.

In some implementations, the proxy device may be configured to distribute transformed data to a first local device and one or more other local devices to help processing the transformed data for the first local device in parallel. The local devices may be configured to process the data received from the proxy device. The other local device(s) may be configured to send processed data to the first local device. The first local device may use information in the processed data received from the other local device(s) without having to process the data as much. As a result, the proxy device and the other local devices together may form a hierarchical network of proxy devices for the first local device. For example, the proxy device may be connected to a laptop and a smartphone. The proxy device may receive H.264 data from a remote device and generate transformed data comprising only I-frames. The proxy may send a first I-frame to the laptop. The proxy may also send a second I-frame to the smartphone while waiting for the laptop to finish decoding the first I-frame. The smartphone may be connected to the laptop via a high-speed data cable (e.g., USB-C). When the smartphone has finished decoding the second I-frame into a raw frame, the smartphone may send the raw frame to the laptop. The laptop may be configured to display the raw frame received from the smartphone after it has decoded and displayed the first I-frame.

In some implementations, the proxy device 10 may be configured to allow the user to control multiple peripheral devices of the members of the union as if the multiple peripheral devices were connected to a single virtual device. For example, the proxy device 10 may be connected to two local devices as members of a union. One of the two local devices may be connected to a pointing device (e.g., a mouse). Each local device may be connected to a physical monitor. The proxy device 10 may receive user input to the pointing device from the corresponding local device. The proxy device 10 may communicate with the two local devices to draw a cursor of the pointing device accordingly on the physical monitors such that both monitors may appear to be connected to a single virtual device and that the pointing device may appear to traverse both monitors.

Thus, unionization/confederation/aggregation of data provided by the proxy device 10 may enable a user input device connected to a single local device to be used as if all monitors are connected to the single local device. A user input device may refer to a device that enables a user to provide input to the local device. The input provided by the user may be relayed to the proxy device 10 and/or the remote device to change the video data. For example, a user input device may include one or more of a mouse, a keyboard, a joystick, a pointing stick, a touchscreen display, and/or other devices that are configured to receive user input.

The proxy device 10 may coordinate the multiple independent local devices (each connected to one or more monitors) such that the user input device connected to one of the local devices works on all of the monitors as if the monitors were connected to the one local device. For example, the user input device (pointer device) may be used to control a pointer (e.g., cursor) within a remote desktop application. The proxy device 10 may receive control of the pointer (e.g., cursor movement, cursor clicks) from a local device and distribute the pointer movement and/or pointer icon data (e.g., cursor shape, cursor color, cursor visibility) to the appropriate local devices. The pointer may be presented on one or more of the monitors based on the data distributed to the local devices by the proxy device. The functionalities for coordinating the usage of the pointer device across multiple independent local devices may be referred to and/or provided by a pointer director (e.g., mouse director, joystick director). The pointer director may include a set of processes, applications, functionalities, software, and/or hardware to provide coordination of pointer control across multiple independent local devices.

Figure 6:
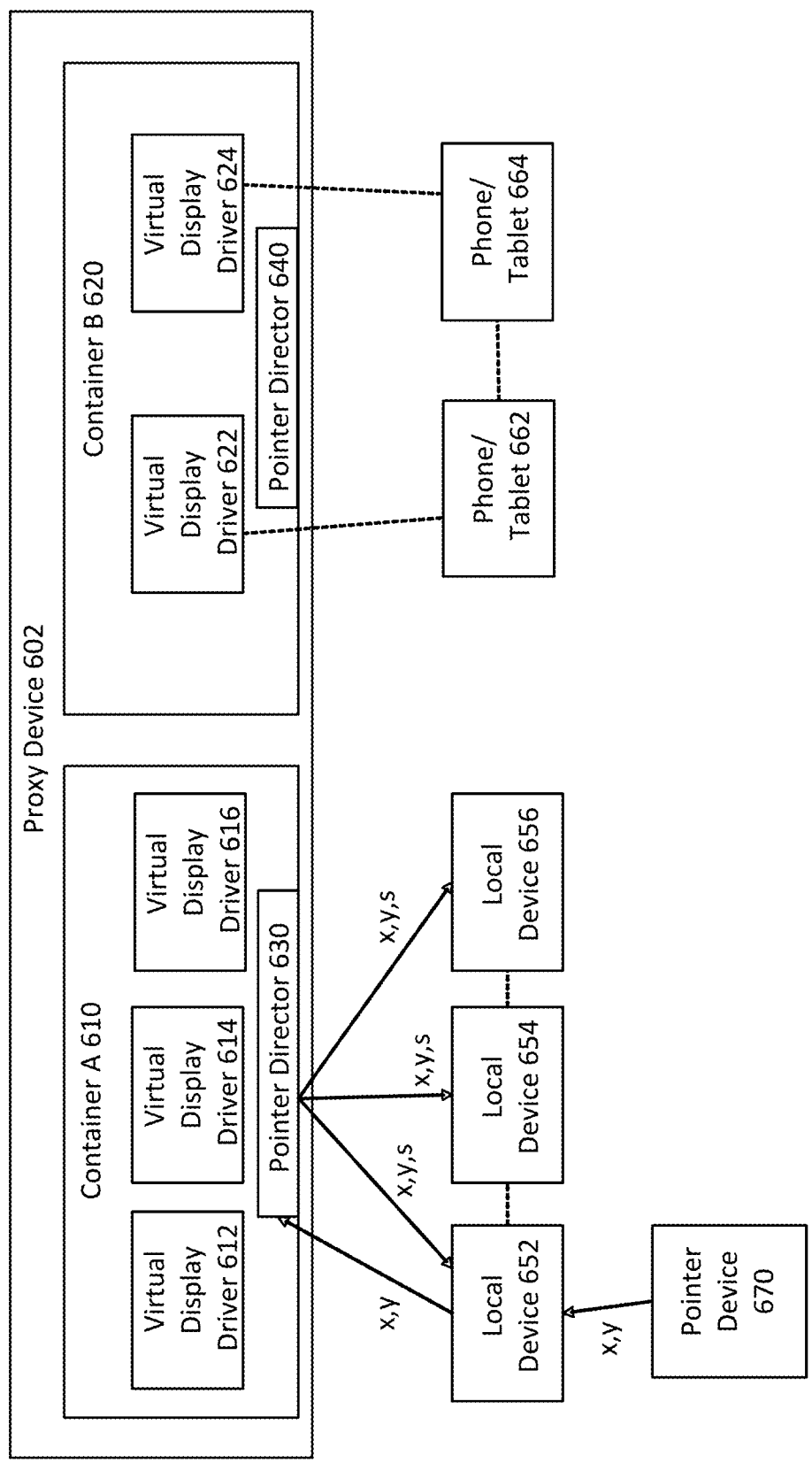
FIG. 6 illustrates an example proxy device for local device confederation/unionization/aggregation, in accordance with various implementations of the disclosure.

FIG. 6 illustrates an example proxy device 602 for local device confederation/unionization/aggregation. The proxy device 602 may be connected to local devices 652, 654, 656, phones/tablets 662, 664, and/or other local devices. A pointer device 670 may be connected to the local device 652. The proxy device 602 may run separate containers for separate groups of local devices. For example, the proxy device 602 may run a container A 610 for video data to be transmitted to the local devices 652, 654, 656 and a container B 620 for video data to be transmitted to the phones/tablets 662, 664. The proxy device 602 may run a virtual display driver 612 for monitor(s) reported by/connected to the local device 652, a virtual display driver 614 for monitor(s) reported by/connected to the local device 654, and a virtual display driver 616 for monitor(s) reported by/connected to the local device 656. The proxy device 602 may run a virtual display driver 622 for monitor(s) reported by/connected to the phone/tablet 662, and a virtual display driver 624 for monitor(s) reported by/connected to the phone/tablet 664. The monitor(s) reported by/connected to the local devices 652, 654, 656 and/or the phones/tablets 662, 664 may include integrated displays of the local devices 652, 654, 656 and/or the phones/tablets 662, 664, and/or external monitors connected to the local devices 652, 654, 656 and the phones/tablets 662, 664.

The proxy device 602 may run a pointer director 630 for the local devices 652, 654, 656 and a pointer director 640 for the phones/tablets 662, 664. The pointer director 630 may coordinate usage of the pointer device 670 across content displayed on monitors connected to/driven by the local devices 652, 654, 646. The pointer director 640 may coordinate usage of a pointer device (e.g., touchscreen displays of the phones/tablets 662, 664) across content displayed on monitors connected to/driven by the phones/tablets 662, 664.

For example, a user may use the pointer device 670 to change the location of a pointer (e.g., cursor movement in the (x, y) coordinate). The movement of the pointer may be received by the pointer director 630. The pointer director 630 may determine the new pointer location to determine where on which of the monitors the pointer (e.g., mouse cursor) should be shown. The pointer director 630 may send one or more commands to the relevant local device(s) to update the pointer location accordingly. The pointer director 630 may send information other than location information of the pointer to the local devices. For example, the pointer director 630 may send information on shape of the pointer for the relevant local devices to update the shape (e.g., invisible, hour-glass, arrow, hand) of the pointer.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Any communication medium may be used to facilitate interaction between any components of the system 200, the server device 202, the proxy 204, the switch 206, and/or the local devices 212, 214, 216. One or more components of system 200, the remote device 202, the proxy 204, the switch 206, and/or the local devices 212, 214, 216 may communicate with each other through hard-wired communication, wireless communication, or both. As non-limiting examples, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although processor components are illustrated in FIG. 1 as being co-located within a single processing unit, in implementations in which processor 11 comprises multiple processing units, one or more of processor components may be located remotely from the other processor components. Processor components may comprise instructions which may program processor 11 and/or proxy device 10 to perform the functionalities descried herein and/or specialized hardware designed to perform the functionalities described herein.

The description of the functionality provided by the different processor components described herein is for illustrative purposes, and is not intended to be limiting, as any of processor components may provide more or less functionality than is described. For example, one or more of processor components may be eliminated, and some or all of its functionality may be provided by other processor components. As another example, processor 11 may be configured to execute one or more additional processor components that may perform some or all of the functionality attributed to one or more of processor components described herein.

The electronic storage media of electronic storage 12 may be provided integrally (i.e., substantially non-removable) with one or more components of proxy device 10 and/or as removable storage that is connectable to one or more components of proxy device 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within proxy device 10, or electronic storage 12 may be provided integrally with one or more other components of proxy device 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A proxy system, comprising:
one or more processors configured to facilitate the proxy system to organize a set of two or more local devices as members of a union, wherein the proxy system creates a set of virtual peripheral devices representing a set of two or more physical peripheral devices connected to different local devices of the set of local devices;
wherein:
the proxy system communicates the set of virtual peripheral devices to a remote device; and
the proxy system coordinates, via the set of virtual peripheral devices, relay of input information from at least one of the two or more physical peripheral devices connected to the different local devices to the remote device and relay of output information from the remote device to at least one of the two or more physical peripheral devices connected to the different local devices as if the set of two or more physical peripheral devices were connected to a single device.

2. The proxy system of claim 1, wherein the proxy system allows a user to control the set of two or more physical peripheral devices connected to the different local devices as if they were connected to the single device.

3. The proxy system of claim 2, wherein the proxy system allows the user to control a pointing device connected to a single local device to traverse a set of monitors connected to the set of two or more local devices, wherein the proxy system coordinates, via the set of virtual peripheral devices, relay of information on movement of the pointing device to the remote device and relay of information on position of a cursor for the pointing device to the set of two or more local devices to which the set of monitors are connected for presentation of the cursor on one or more of the set of monitors.

4. The proxy system of claim 1, wherein the set of two or more local devices include different types of local devices.

5. The proxy system of claim 4, wherein the set of two or more local devices include a laptop and a smartphone, and the set of virtual peripheral devices communicated by the proxy system to the remote device includes a first virtual display corresponding to a display of the laptop and a second virtual display corresponding to a display of the smartphone, wherein the first virtual display and the second virtual display enable relay of information for the display of the laptop and the display of the smartphone as if the display of the laptop and the display of the smartphone were connected to the single device.

6. The proxy system of claim 5, wherein the set of virtual peripheral devices communicated by the proxy system to the remote device further includes a first virtual input device corresponding to a keyboard of the laptop, a second virtual input device corresponding to a touchpad of the laptop, a third virtual input device corresponding to a virtual keyboard of the smartphone, and/or a fourth virtual input device corresponding to a virtual touchpad of the smartphone, wherein the first virtual input device, the second virtual input device, the third virtual input device, and/or the fourth virtual input device enable relay of information for the keyboard of the laptop, the touchpad of the laptop, the virtual keyboard of the smartphone, and/or the virtual touchpad of the smartphone as if the keyboard of the laptop, the touchpad of the laptop, the virtual keyboard of the smartphone, and/or the virtual touchpad of the smartphone were connected to the single device.

7. The proxy system of claim 5, wherein the set of virtual peripheral devices communicated by the proxy system to the remote device further includes a virtual speaker device having a first virtual channel corresponding to a channel of a speaker of the laptop and a second virtual channel corresponding to a channel of a speaker of the smartphone, further wherein the proxy system receives audio information from the remote device and relays a portion of the audio information corresponding to the first virtual channel to the laptop and relays a portion of the audio information corresponding to the second virtual channel to the smartphone as if the speaker of the laptop and the speaker of the smartphone were connected to the single device.

8. A method for utilizing a proxy device, system, comprising:
  facilitating the proxy system to organize a set of two or more local devices as members of a union, wherein the proxy system creates a set of virtual peripheral devices representing a set of two or more physical peripheral devices connected to different local devices of the set of local devices;
  wherein:
    the proxy system communicates the set of virtual peripheral devices to a remote device; and
    the proxy system coordinates, via the set of virtual peripheral devices, relay of input information from at least one of the two or more physical peripheral devices connected to the different local devices to the remote device and relay of output information from the remote device to at least one of the two or more physical peripheral devices connected to the different local devices as if the set of two or more physical peripheral devices were connected to a single device.

9. The method of claim 8, wherein the proxy system allows a user to control the set of two or more physical peripheral devices connected to the different local devices as if they were connected to the single device.

10. The method of claim 9, wherein the proxy system allows the user to control a pointing device connected to a local device to traverse a set of monitors connected to the set of two or more local devices, wherein the proxy system coordinates, via the set of virtual peripheral devices, relay of information on movement of the pointing device to the remote device and relay of information on position of a cursor for the pointing device to the set of two or more local devices to which the set of monitors are connected for presentation of the cursor on one or more of the set of monitors.

11. The method of claim 8, wherein the set of two or more local devices include different types of local devices.

12. The method of claim 11, wherein the set of two or more local devices include a laptop and a smartphone, and the set of virtual peripheral devices communicated by the proxy system to the remote device includes a first virtual display corresponding to a display of the laptop and a second virtual display corresponding to a display of the smartphone, wherein the first virtual display and the second virtual display enable relay of information for the display of the laptop and the display of the smartphone as if the display of the laptop and the display of the smartphone were connected to the single device.

13. The method of claim 12, wherein the set of virtual peripheral devices communicated by the proxy system to the remote device further includes a first virtual input device corresponding to a keyboard of the laptop, a second virtual input device corresponding to a touchpad of the laptop, a third virtual input device corresponding to a virtual keyboard of the smartphone, and/or a fourth virtual input device corresponding to a virtual touchpad of the smartphone, wherein the first virtual input device, the second virtual input device, the third virtual input device, and/or the fourth virtual input device enable relay of information for the keyboard of the laptop, the touchpad of the laptop, the virtual keyboard of the smartphone, and/or the virtual touchpad of the smartphone as if the keyboard of the laptop, the touchpad of the laptop, the virtual keyboard of the smartphone, and/or the virtual touchpad of the smartphone were connected to the single device.

14. The method of claim 12, wherein the set of virtual peripheral devices communicated by the proxy system to the remote device further includes a virtual speaker device having a first virtual channel corresponding to a channel of a speaker of the laptop and a second virtual channel corresponding to a channel of a speaker of the smartphone, further wherein the proxy system receives audio information from the remote device and relays a portion of the audio information corresponding to the first virtual channel to the laptop and relays a portion of the audio information corresponding to the second virtual channel to the smartphone as if the speaker of the laptop and the speaker of the smartphone were connected to the single device.

* * * * *